US012578272B2

(12) United States Patent
Piette et al.

(10) Patent No.: US 12,578,272 B2
(45) Date of Patent: Mar. 17, 2026

(54) UNIVERSAL MULTI-DETECTION SYSTEM FOR MICROPLATES WITH CONFOCAL IMAGING

(71) Applicant: AGILENT TECHNOLOGIES, INC., Santa Clara, CA (US)

(72) Inventors: Ross Marcel Piette, Santa Clara, CA (US); Xavier Francois Patrick Amouretti, Santa Clara, CA (US); Caleb Alan Foster, Santa Clara, CA (US); Benjamin Jon Knight, Santa Clara, CA (US); Peter Brent Knox, Santa Clara, CA (US); Ben Edward Norris, Santa Clara, CA (US); James Donald Piette, Santa Clara, CA (US); Richard Niles Sears, Santa Clara, CA (US); Matthew Arthur Stiles, Santa Clara, CA (US); Oleg Nikolaevich Zimenkov, Santa Clara, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 194 days.

(21) Appl. No.: 18/038,884

(22) PCT Filed: Dec. 2, 2021

(86) PCT No.: PCT/US2021/061610
§ 371 (c)(1),
(2) Date: May 25, 2023

(87) PCT Pub. No.: WO2022/120047
PCT Pub. Date: Jun. 9, 2022

(65) Prior Publication Data
US 2024/0003810 A1      Jan. 4, 2024

Related U.S. Application Data

(60) Provisional application No. 63/120,605, filed on Dec. 2, 2020.

(51) Int. Cl.
*G01N 21/64*          (2006.01)
*G01N 21/76*          (2006.01)

(52) U.S. Cl.
CPC ..... *G01N 21/6452* (2013.01); *G01N 21/6458* (2013.01); *G01N 21/76* (2013.01)

(58) Field of Classification Search
CPC ........... G01N 21/6452; G01N 21/6458; G01N 21/76; G01N 21/0332; G01N 21/253;
(Continued)

(56) References Cited

U.S. PATENT DOCUMENTS 5,989,835  A      11/1999  Dunlay et al.
6,097,025  A      8/2000   Modlin et al.
(Continued)

FOREIGN PATENT DOCUMENTS

EP          1936424  A2      6/2008
JP          3466568  B2      11/2003
(Continued)

OTHER PUBLICATIONS

International Search Report of PCT/US2021/061610 dated Apr. 11, 2022 [PCT/ISA/210].
(Continued)

*Primary Examiner* — Tarifur R Chowdhury
*Assistant Examiner* — Carlos Perez-Guzman
(74) *Attorney, Agent, or Firm* — K&L Gates LLP

(57) ABSTRACT

An apparatus for optically analyzing a sample may include an imaging subsystem that images the sample, one or more analyzing subsystems that analyze the sample including a confocal imaging subsystem, a temperature control subsystem that controls a temperature of the atmosphere within the apparatus, a gas control subsystem that controls a compo-
(Continued)

sition of the atmosphere within the apparatus, and a control module that controls the various subsystems of the apparatus.

12 Claims, 30 Drawing Sheets

(58) Field of Classification Search
CPC .......... G01N 15/1434; G01N 15/1468; G01N 2015/1006; G01N 2015/1445; G02B 21/0004; G02B 21/0088; G02B 21/26
See application file for complete search history.

(56) References Cited

U.S. PATENT DOCUMENTS

| | | | |
|---|---|---|---|
| 6,313,471 | B1 | 11/2001 | Giebeler et al. |
| 6,654,119 | B1 | 11/2003 | Gould et al. |
| 7,782,454 | B2 | 8/2010 | Zimenkov et al. |
| 8,179,597 | B2 | 5/2012 | Namba et al. |
| 8,218,141 | B2 | 7/2012 | Zimenkov et al. |
| 9,557,217 | B2 | 1/2017 | Zimenkov et al. |
| 10,072,982 | B2 | 9/2018 | Zimenkov et al. |
| 2017/0108438 | A1 | 4/2017 | Zimenkov et al. |
| 2017/0336615 | A1* | 11/2017 | Nakamura ......... G02B 21/0088 |
| 2019/0195684 | A1 | 6/2019 | Katzlinger et al. |
| 2019/0310454 | A1* | 10/2019 | Shimada .............. G02B 21/088 |
| 2020/0147601 | A1* | 5/2020 | Briggs ...................... B01L 3/02 |
| 2020/0249456 | A1 | 8/2020 | Lee |
| 2021/0157114 | A1* | 5/2021 | Pattison ................ G02B 27/58 |

FOREIGN PATENT DOCUMENTS

| | | | |
|---|---|---|---|
| JP | 2016118762 | A | 6/2016 |
| JP | 2018124499 | A | 8/2018 |
| JP | 2019-113435 | A | 7/2019 |
| JP | 2019-184684 | A | 10/2019 |
| WO | 2006/061640 | A2 | 6/2006 |
| WO | 2019/104155 | A2 | 5/2019 |

OTHER PUBLICATIONS

Written Opinion of PCT/US2021/061610 dated Apr. 11, 2022 [PCT/ISA/237].
Extended European Search Report issued Oct. 2, 2024 in Application No. 21901460.2.
Communication dated Jul. 4, 2025 in Japanese Application No. 2023-534011.
Office Action received in Japanese Patent Application No. 2023-534011 dated Dec. 23, 2025, 5 pages.

\* cited by examiner

204 μm

210 μm

2000

2000

2000

2305

UNIVERSAL MULTI-DETECTION SYSTEM FOR MICROPLATES WITH CONFOCAL IMAGING

CROSS-REFERENCE TO RELATED APPLICATION

This application is a U.S. National Stage of International Application No. PCT/US2021/061610, filed on Dec. 2, 2021, which claims priority to and benefit of U.S. Provisional Application No. 63/120,605, filed on Dec. 2, 2020, the entire contents of which are incorporated herein by reference in their entireties.

BACKGROUND

1. Field

Apparatuses and methods consistent with embodiments of the disclosure relate to microplate-based detection systems providing multiple detection modes including the detection of fluorescence, chemiluminescence, and absorbance of samples disposed in microwells, and imaging of microplate well contents on a cellular level and subcellular level utilizing wide-field and confocal microscopy.

2. Description of the Related Art

Various different analytical instruments may be employed by research laboratories to evaluate specimen samples that are disposed in vessels of diverse shapes and sizes. Conventionally, a microplate format system has become increasingly popular, as the use of the microplate format system lends itself to testing many samples on a single-matrix style receptacle.

FIG. 1 is a diagram illustrating a conventional ninety-six well plate 1 including ninety-six wells 2 of round shape disposed in rows and columns. FIG. 2 is a diagram illustrating a conventional 384-well plate 3 including 384 square-shaped wells 4. Depending on configuration, even higher density wells may exist, such as wells including 1536 wells, arranged in rows and columns while having a same overall dimensional size (height, width, etc.) of the microplate.

Microplate-based detection methods have progressed from simple absorbance, to fluorescence, and chemiluminescence. Other adaptations of microplate-based systems include fluid injectors and incubators to process and analyze microplates at controlled temperatures, necessary for kinetic assays in which a temperature near to human body temperature is maintained over extended periods of time. Similarly, atmospheric control systems for controlling the gas environment surrounding a microplate has been developed to enable long-term study of live cells disposed into microplates.

Single-function, specialized instruments have progressed to multi-detection instruments in which several detection modalities are combined in a single instrument. While early multi-detection instruments were filter-based, with several commonly used analysis wavelengths for selection, next generation multi-detection instrumentation further included monochromators to enable researchers to select wavelength bands from a broad range of spectrum that could be offered in one instrument, typically within the 200 nm to 1000 nm wavelength range. Accordingly, early monochromator-based instruments, for example described in U.S. Pat. No. 6,313, 471, combined single grating monochromators with band pass filters. However, although advantageous for the flexible selection of any wavelength, the purity of a spectrum band selected in such units did not match that available from research level spectroscopy instrumentation.

Subsequent monochromator-based multi-detection instruments became based on double monochromators, in which purity of light was sufficient to reach detection limits comparable to filter-based instruments, for example as described in U.S. Pat. No. 6,654,119. Therein, two gratings in series may be deployed in an excitation double monochromator and two gratings in series may be deployed in an emission double monochromator. In addition to wavelength selection, depending on the assay being analyzed, these instruments also allow spectral scanning of samples for both absorbance and fluorescence, thus greatly enhancing the utility of the single instrument utilized in the modern laboratory.

As the market bifurcated into filter-based instrumentation for high sensitivity, serving the High Throughput Screening (HTS) market, and monochromator-based instruments used primarily in research, instrumentation that combines both became developed, for example as described in U.S. Pat. Nos. 7,782,454 and 8,218,141, in which the filter-based reading and monochromator-based reading are provided in a single instrument.

While hybrid-type filter-based and monochromator-based detection instruments addressed the filter-monochromator dichotomy, such instruments were primarily used with homogenous assays in which the number of samples processed per hour was at a premium. The research area in which systems of this design were deployed is known as High Throughput Screening (HTS), for quickly processing a large quantity of samples in wells of microplates with few parameters recorded per sample. Optimized for speed, analysis is performed as quickly as possible, to look for wells that show some unique properties, and then focus on those wells of "hits" warranting further investigation. Such subsequent investigation being typically performed by a separate line of more-detailed analysis instruments.

Typically, most assays are predominantly biochemical-based, and HTS technology was the preferred method for drug discovery research and analysis. As the cost of drug discovery increased, a need for more biologically-relevant models drove growth in two-dimensional (2D) cell-based assays using a single monolayer of cells. Researchers acknowledged the limits of the homogenous assays and wanted to study behavior of individual cells. Accordingly, cells were redistributed from traditional lab vessels like, Petri dishes, to microplates. Consequently, the number of parameters for analysis could be dramatically increased.

Initially, the wells of microplates were imaged using traditional microscopes, and later via dedicated imagers. Due to the vast amount of information available in even a single image, the imaging of cells in microplates may be known as High Content Screening (HCS), for example as described in U.S. Pat. No. 5,989,835.

The HTS non-imaging instrumentation and HCS imaging instrumentation have existed in parallel in the market. Systems leveraging both types of capabilities have been developed, and thereby researchers may access non-imaging analysis modalities, such as fluorescence, absorbance, and chemiluminescence, and imaging in microwells on the cell level, in the same instrument, for example as described in U.S. Pat. Nos. 9,557,217 and 10,072,982. These instruments implement wide field microscopy, in which a complete field of view of each microscope objective is illuminated and imaged. This type of analysis is suitable for studying monolayers of cells.

FIG. 3 is a diagram illustrating cells seeded in a well of a microplate. Cells 42 seeded in the bottom of a well 41 of a microplate are grown, for example within an environment controlling atmosphere and humidity. Therein, growing cells 42 multiply and spread to cover the bottom of the well 41. The depth of the cell layer may be limited to single cell and a sharp, highly informative image of the cells can be obtained via wide field imaging and microscopy.

Recently, researchers have recognized that adherent cells in microwells, which appear as a two-dimensional (2D) layer, while very useful, have limitations in accurately representing living tissues. This is because cells in living tissues ultimately grow in three dimensions. Thus, three-dimensional (3D) cell cultures would be desirable in a next step of cell research.

A 3D cell culture is an artificially created environment in which biological cells are induced to grow and interact with their surroundings in three dimensions. This closely mimics actual growth of cells in vivo.

Three-dimensional cell cultures are called spheroids. Spheroids can also be grown in wells of microplates. Pharmaceutical research on cells in spheroids grown in microwells aims to more closely replicate in vivo cell behavior. For example, for purposes of drug toxicity screening, testing gene expression of in vitro cells grown in three dimensions is more useful than testing in two dimensions, since the gene expression in the 3D spheroids will more closely resemble gene expression in vivo. Also, 3D cell cultures have greater stability and longer life spans than cells in 2D culture, and hence 3D cell cultures may be more suitable for long term studies and for demonstrating long term effects of the drugs.

FIG. 4 is a diagram schematically illustrating 3D cells in a microwell. As illustrated in FIG. 4, a 3D cluster of individual cells 62 forming a spheroid 63 is located on a bottom of a microwell 61. For example, 3D assays may include spheroids, tumoroids, organoids, matrigels, drosophila, zebrafish and 3D printed biomaterial scaffolds for cell growth. In each of these cases, wide field fluorescence imaging has limitations as an imaging detection method due to illumination of the entire sample, which leads to heavy background "noise" that reduces the ability to obtain well-resolved images as sample thickness increases.

Thus, additional methods of screening 3D spheroids would be desirable.

SUMMARY

Cell based assays, and in particular live cell assays, are becoming more popular in the field of life science research. Microplates are increasingly used as vessels for investigation of the cell growth process by qualitative and quantitative means. Often the work with cells is performed by a researcher utilizing multiple dedicated instruments.

Fluorescence reading with instrumentation that has a light beam diameter sufficiently large to obtain a representative measurement of total well fluorescence, or of beam size to perform an area scanning and mapping of the signal across the well, can be accomplished with a dedicated conventional fluorescence reader or with a multi-detection reader. Most of the instruments provide incubation of the plate, fluid injection, and also allow an option of a gas control ($CO_2$ and/or $O_2$) similar to tissue culture incubators.

Much more information than just well's fluorescence signal level can be obtained from cells with the wide-field imaging modality. Laboratory microscopes, with bright field and phase contrast for unstained cells and fluorescence imaging for stained cells, are commonly used. Some instruments do allow for incubation chambers and environmental control. For sharper imaging or sectioning of 3D cell clusters like spheroids, confocal microscopy is used as a third instrumentation option.

Typically these lines of instruments come from various vendors, and a user may be forced to physically transfer the microplate from instrument to instrument as needed, as well as to keep track of the overall sample analysis process and to manipulate data from several units to obtain complete analysis results. Without robotics, it may be nearly impossible to properly conduct a long term complex experiment. This further increases both analysis cost and complexity. The combination of non-imaging analysis modalities (fluorescence, absorbance and chemiluminescence), wide-field fluorescence imaging on a cell level, confocal fluorescence imaging, environmental control, and reagent injections in a single instrument would provide a complete analysis solution, and would free the researcher from tedious microplate handling, microplate tracking and data transfer.

Embodiments described herein overcome the above disadvantages and other disadvantages not described above. Also, the embodiments are not required to overcome the disadvantages described above, and an example embodiment may not overcome any of the problems described above.

According to an aspect of an example embodiment, there is provided a device for analyzing one or more samples, the device including a support for a receptacle that holds a sample; an imaging subsystem that images the sample; and an analyzing subsystem that analyzes the sample.

According to an aspect of an example embodiment, there is provided a sample analysis method including selecting at least one subsystem from among a plurality of subsystems of a sample analysis device that examines one or more samples, the plurality of subsystems comprising an imaging subsystem that images the one or more samples and an analyzing subsystem that analyzes the one or more samples; and controlling the selected at least one subsystem to perform an examination on the one or more samples, the examination comprising an imaging operation of the imaging subsystem that images the one or more samples and an analyzing operation of the analyzing subsystem that analyzes the one or more samples.

According to an aspect of an example embodiment, there is provided a non-transitory computer-readable medium having embodied thereon a program which when executed by a computer causes the computer to execute a sample examination method, the method including selecting at least one subsystem from among a plurality of subsystems of a sample analysis device that examines one or more samples, the plurality of subsystems comprising an imaging subsystem that images the one or more samples and an analyzing subsystem that analyzes the one or more samples; and controlling the selected at least one subsystem to perform an examination on the one or more samples, the examination comprising an imaging operation of the imaging subsystem that images the one or more samples and an analyzing operation of the analyzing subsystem that analyzes the one or more samples.

According to an aspect of an example embodiment, there is provided a device for analyzing a sample. The device may include: a receptacle support configured to support a microplate comprising a microplate well configured to hold the sample; an objective configured for imaging the sample; a laser point scanning confocal system configured to image the sample via the objective; and a spinning disk and/or wide field imaging system configured to image the sample via the objective, wherein at least a portion of both the laser point scanning confocal system and the spinning disk and/or wide field imaging system is movably provided such that the laser point scanning confocal system and the spinning disk and/or wide field imaging system are configured to be selectively aligned with the objective for imaging the sample.

BRIEF DESCRIPTION OF THE DRAWINGS

The above and other aspects will become more apparent by describing in detail example embodiments thereof with reference to the attached drawings, in which.

DETAILED DESCRIPTION OF EMBODIMENTS

An imaging modality known as confocal imaging may be well-suited for imaging 3D cell structures. In confocal imaging, a sample may be illuminated one point or portion at a time. For example, light may be passed through a small aperture such as a pinhole positioned at an optically conjugate plane. The point illumination substantially eliminates out of focus light and background light, and thereby increases the optical resolution and contrast of the image. The complete image, built or stitched together point by point via a scanning function, is very sharp with well-defined features. The scanning function may be performed with the spinning disk, also known as scanning disk or Nipkow disk.

Confocal imaging is a particularly well-suited imaging modality to be used with spheroids. With confocal imaging, a spheroid can be sectioned, layer by layer, and a 3D model may be created in a computer for both exact cell counting and 3D image manipulation to observe a spheroid from various angles.

Figure 5A:
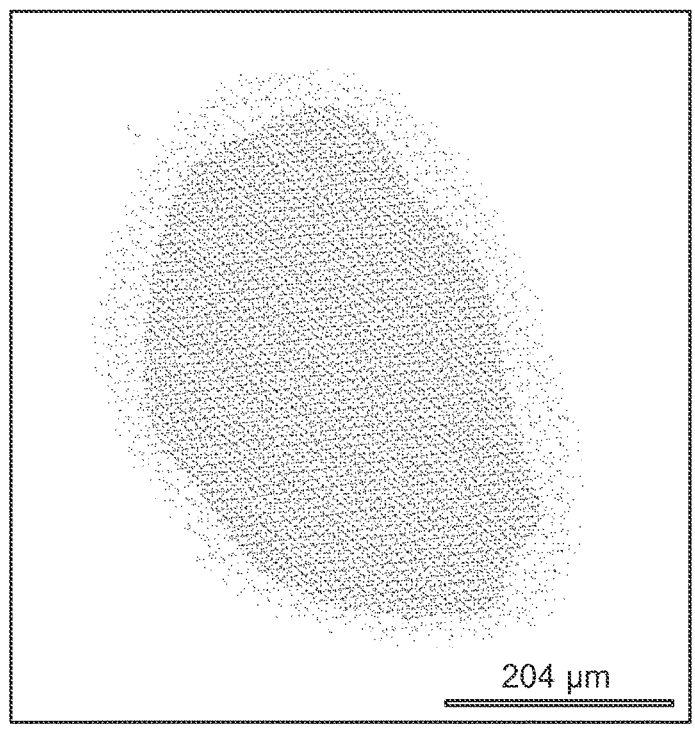
FIGS. 5A and 5B are comparative illustrations of a spheroid.
Figure 5B:
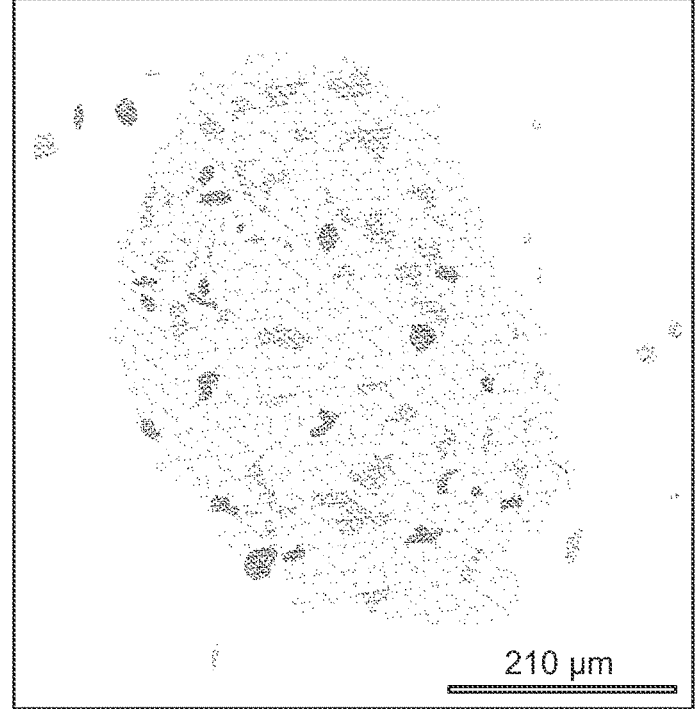

FIGS. 5A and 5B are a comparative illustration of a spheroid. FIG. 5A illustrates a spheroid taken at twenty times (20×) magnification with wide field imaging. FIG. 5B illustrates the spheroid taken at twenty times (20×) magnification with and confocal imaging. While the size of the spheroid may be assessed using the image of FIG. 5A, the individual cells and spheroid structure only become visible with the confocal imaging in FIG. 5B.

The advantage of resolution attributed to confocal imaging of FIG. 5B is provided at the expense of decreased light intensity caused by confocal aperture, such that longer exposure times are often required in comparison to wide-field imaging of FIG. 5A.

The addition of confocal fluorescence imaging to an instrument that also includes non-imaging analysis modalities (fluorescence, absorbance, chemiluminescence, etc.) and wide-field fluorescence imaging on a cell level combined with a controlled live cell environment would deliver to a modern researcher the most versatile single instrument for analyzing microplate-based assay formats, including those aimed at 3D cell spheroids research.

In an example, there may be a workflow in which wide-field imaging is performed for faster screening, while confocal imaging is performed for publication images.

Wide-field imaging may be performed for an HCS type assay, in which the throughput is quicker with wide-field imaging, and the resulting image analysis is still statistically robust. Then, confocal imaging may be employed to acquire representative wells of the "hits" compared to "controls" for publication or presentation purposes.

In an example, there may be a workflow in which wide-field imaging is performed for a quicker primary screening of spheroids based on size. Then, confocal imaging is used for deeper assessment of the size of each "hit" wells, based on nuclear count, which is more accurate using confocal imaging.

Typically, wide-field imaging cannot "see" into the 3D spheroid well enough to reliably count individual nuclei, however, wide-field could still make determinations of "hits" based on total spheroid size. Once "hit" wells are identified with wide-field imaging, identified wells could then be imaged with confocal imaging, to obtain improved image analysis for counting total nuclei in the spheroid, which wide-field imaging alone could not perform.

In an example, there may be a proliferation Assay (3D Endothelial Cell Spheroid Assay) to determine wound healing drug candidates. A primary drug screen may be performed in microplates, in which small endothelial spheroids are treated with an unknown compound library to determine which compounds elicit increased cell growth/proliferation. Compounds that cause increased growth may be contenders for further wound healing studies.

In an analysis workflow, a plate reader may be used to quickly screen the microplate using GFP fluorescence intensity, to determine wells with spheroids of increased size. Wells that meet a threshold of GFP intensity (threshold is statistically determined during assay development) are considered "hits" and selected to be further imaged. Control wells are also always imaged further, as reference wells for comparison with hit wells. Confocal imaging of 3D spheroids may be performed to acquire two-channel z-stack image set (Hoescht 33342 Nuclear marker and GFP marker) of the entire spheroid sample. In image processing and analysis of a maximum projection of Z-stack, a cellular count of spheroid is determined to quantify spheroid size. Visual inspection of distribution of nuclear masks in the image, to determine if there is cell death within the spheroid, is performed. And, results from hit well image analysis are compared to the controls to determine percentage growth against controls.

In an example workflow, 3D tumoroid cytotoxicity and immune response assay (3D Tumoroid Assay from surgical samples to determine Immune and cytotoxic therapeutic response) is performed. The assay involves culturing tumoroids obtained from surgical samples derived from animal models or patients. Because these tumoroids are derived from animals/patients, in-vitro tumor-derived immune cells responses can be evaluated, enabling analysis of tumor response to various therapies. This assay can assess the effectiveness of novel therapeutics in microplate-based format using a heterogeneous multicellular tumor model.

For example, tumoroids may be stained for nuclear count (e.g., blue) and stained for immune cell marker (e.g., red). A microplate reader may be used to assess: wells with high cytotoxicity shown as low blue signal; wells with high immune response shown as high red signal. Wells that meet one or both threshold criteria for cytotoxicity or immune response (threshold is statistically determined during assay development) are considered "hits" and selected to be further imaged. Control Wells are also always imaged further, in order to compare to hit wells. Confocal imaging of 3D tumoroids is performed to acquire two-channel z-stack image set (Hoescht 33342 Nuclear market and CY5 marker) of the entire tumoroid sample. Image processing and analysis is performed for the maximum projection of Z-stack, and cellular count of tumoroid is performed to quantify cellular count. Count of red positive cells is determined for the immune response. Results from hit well image analysis is compared to the controls to determine percentage cytotoxicity or immune response against controls.

Several of the above examples utilize the ability of a single instrument to run an assay as "hit picking." The first rapid read identifies the samples of particular interest, typically using a fast reading method that can be fluorescence non-imaging reading or fluorescence or bright field wide-field imaging reading performed at lower magnification. Once wells of interest are identified, called hits, a second more time consuming modality is deployed to determine results of particular interest. This processing is of particular importance if final results are high resolution confocal imaging, in which large data storage is required and gathering vast amount of information on only a few samples that are of interest provide substantial savings of the data storage space. This processing also saves a processing time during data acquisition and data review, as most samples are not "hits" and are dismissed during the first assay step. A single unified device to perform the various disparate processing steps can streamline the analysis.

Figure 1:
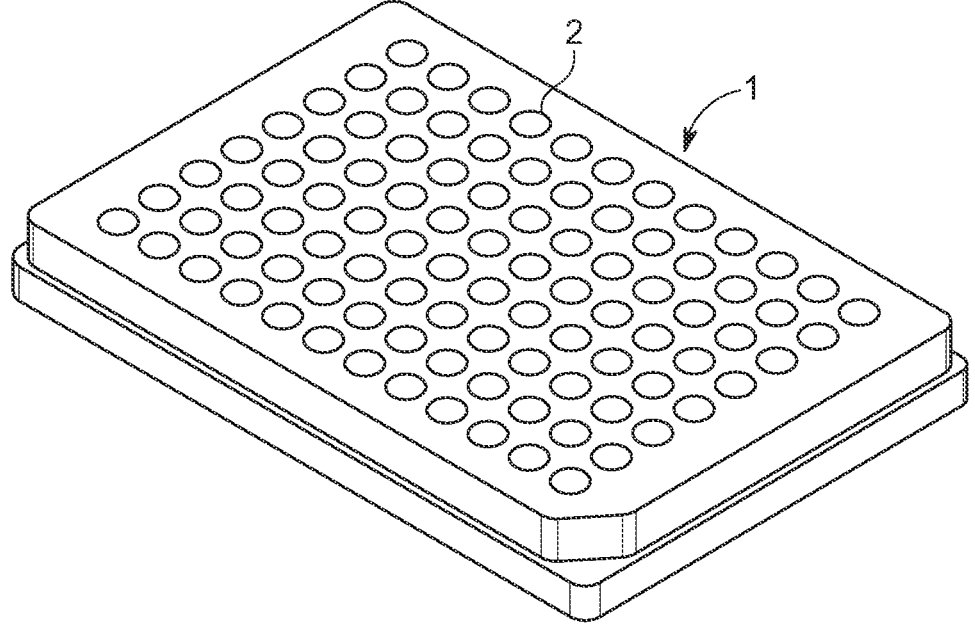
FIG. 1 is a diagram illustrating a conventional ninety-six well plate.
Figure 2:
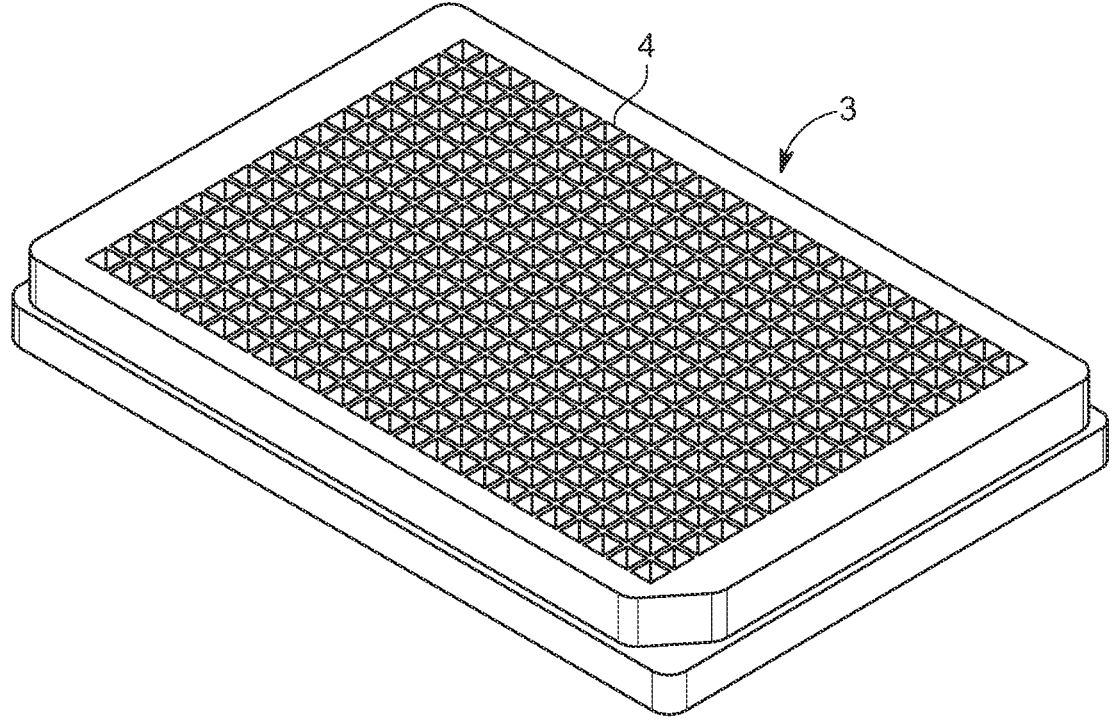
FIG. 2 is a diagram illustrating a conventional 384-well plate.
Figure 3:
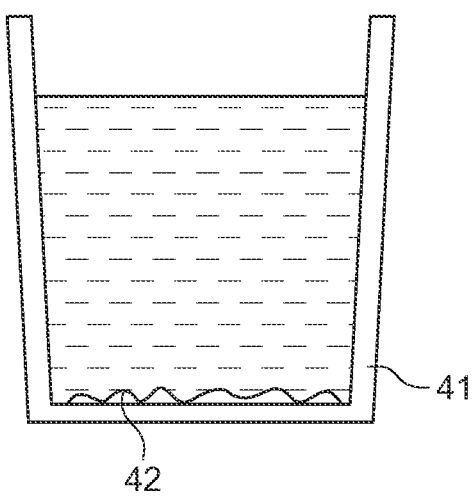
FIG. 3 is a diagram illustrating cells seeded in a well of a microplate.
Figure 4:
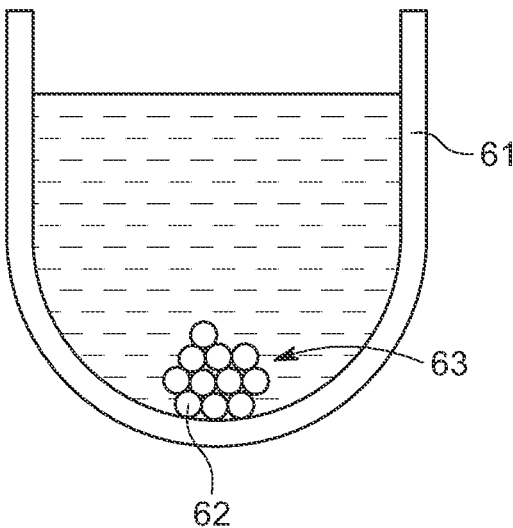
FIG. 4 is a diagram schematically illustrating 3D cells in a microwell.

Other applications of the capabilities of the single instrument with the diverse functionality to study of spheroids are possible. Spheroids are typically grown in round bottom wells, as illustrated in FIG. 4. Often, for the final imaging step, spheroids are transferred into flat bottom plates for the purpose of preventing the rounded well bottom as functioning similar to a lens during imaging, thereby unnecessarily inducing optical aberrations and negatively affecting the resultant image quality. High quality microscope objectives are not designed for such "roundwell" bottom lens in the optical path. After transfer into another well, dish, or plate for the best image quality, the exact location of the spheroid in the well is no longer known. In a preferred embodiment, wide-field imaging at lower magnification but larger field of view to image the well could be performed to locate the spheroid (region of interest), then position the well to bring the found spheroid location (region of interest) in line with the optical axis and use a higher magnification objective with smaller field of view to image the spheroid in confocal modality and perform Z-stack, by collecting multiple images while the objective traverses along the objective's focusing axis, perpendicular to the well bottom surface. The spheroid (region of interest) may be identified by using a non-imaging analysis modality of the instrument by performing fluorescence read area scan and selecting the region of a maximum fluorescence signal fur imaging.

Figure 6:
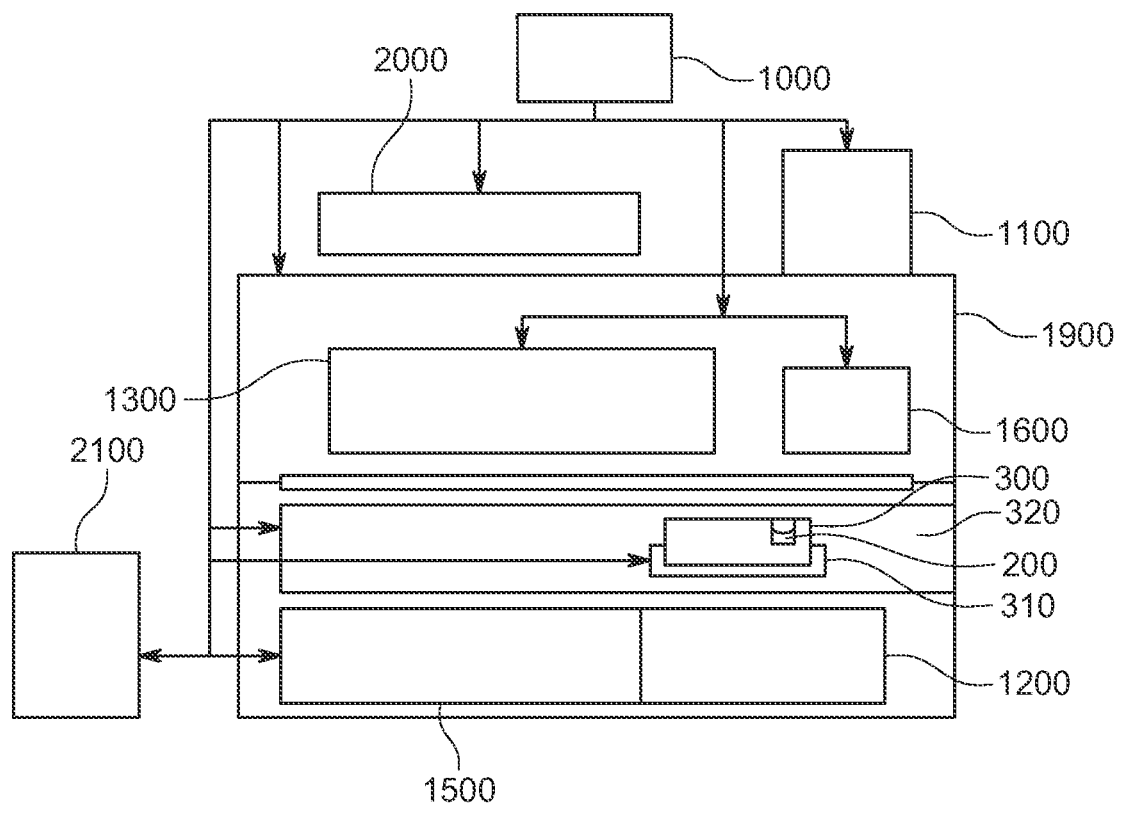
FIG. 6 is a block diagram illustrating a multi-detection system according to an embodiment.

FIG. 6 is a block diagram illustrating a multi-detection system according to an embodiment.

As illustrated in FIG. 6, the multi-detection system includes a controller 1000, a fluid injection subsystem 1100, an imaging subsystem, including wide-field imaging components 1200 and confocal imaging components 1500, a non-imaging analysis subsystem 1300, an imaging illumination subsystem 1600 for wide-field imaging, housing 1900, a microplate 300, a microplate carrier 310, incubation chamber 320 for incubating a sample in a well 200, an environmental control subsystem 2000, and a confocal imaging subsystem. The multi-detection system may also include an external subsystem 2100.

Samples are placed into wells 200 (e.g. microwells) of the microplate 300. The microplate 300 is transported by the microplate carrier 310 into and out of the measurement and incubation chamber 320. When disposed to be exposed to an external environment of the multi-detection system, the microplate 300 may be accessible outside the incubation chamber 320 and/or housing 1900 for access by a technician or robotics arm. When the microplate 300 is disposed within the chamber, various supported imaging and non-imaging analytical modalities may be performed.

The microplate carrier 310 is part of a microplate transport subsystem for positional manipulation of the microplate 300, and may include any suitable combination of belts, platforms, microplate holders, motors, and positioning software executed under hardware control for the positional manipulation. When the microplate 300 is disposed within the incubation chamber 320, the entire microplate 300 remains incubated. The incubation system and incubation chamber 320 will be later described in detail.

The non-imaging analysis subsystem 1300 may be based on illumination via a flash bulb, dual excitation monochromators, and dual emission monochromators, photomultiplier tubes (PMT), and silicon detectors. The non-imaging analysis subsystem 1300 supports absorbance, fluorescence, and chemiluminescence analysis modalities for detection of corresponding properties of the sample in the well 200. The non-imaging analysis subsystem 1300 may be implemented as a filter-based subsystem or as hybrid of any or all of the above.

The imaging subsystem includes wide-field imaging components 1200 and confocal imaging components 1500, such as objectives, lenses, LEDs, filter cubes, spinning disks, cameras and other components. The imaging illumination subsystem 1600 includes illumination components for wide-field imaging and is able to provide illumination for bright field, color bright field, and phase contrast imaging modalities.

The external subsystem 2100 may be an external confocal illumination subsystem for confocal imaging that can be modularly connected to and disconnected from the imaging subsystem within the housing 1900 via fiber optics for added flexibility of the physical placement of the external subsystem 2100 relative to the instrument. Alternatively, the confocal imaging illumination subsystem may be disposed to be integrated within the housing 1900.

The fluid injection subsystem 1100 delivers reagent to the wells 200, if required by an assay. The fluid injection subsystem 1100 may include any combination of pumps, reservoirs, lines or tubing, pipettes and tips, and software executed under hardware control for delivering, and if necessary aspirating, fluid to and from the wells.

The environmental control subsystem 2000 shown externally placed relative to housing 1900 may include a gas control module that provides control of atmospheric conditions inside the housing 1900. Other control modules may include modules for control of temperature, humidity, and other conditions, which may be controlled within the housing 1900 under control of the environmental control subsystem 2000. The environmental control subsystem may include any combination of pumps, reservoirs, lines or tubing, fans, heating and cooling elements, and the like for controlling all conditions within the housing 1900. The housing 1900 houses most of the subsystems and defines the physical space in which gas atmosphere, conducive to live cells, can be effectively maintained and controlled by the environmental control subsystem 2000.

The controller 1000 may control all operations of the multi-detection system. The controller 1000 may communicate by wire or wirelessly to each of the various subsystems in the multi-detection subsystem. The controller 1000 may include any combination of hardware (e.g., CPU, memory, cables, connectors, etc.) and software for execution by the hardware for controlling operations of the multi-detection system.

Figure 7:
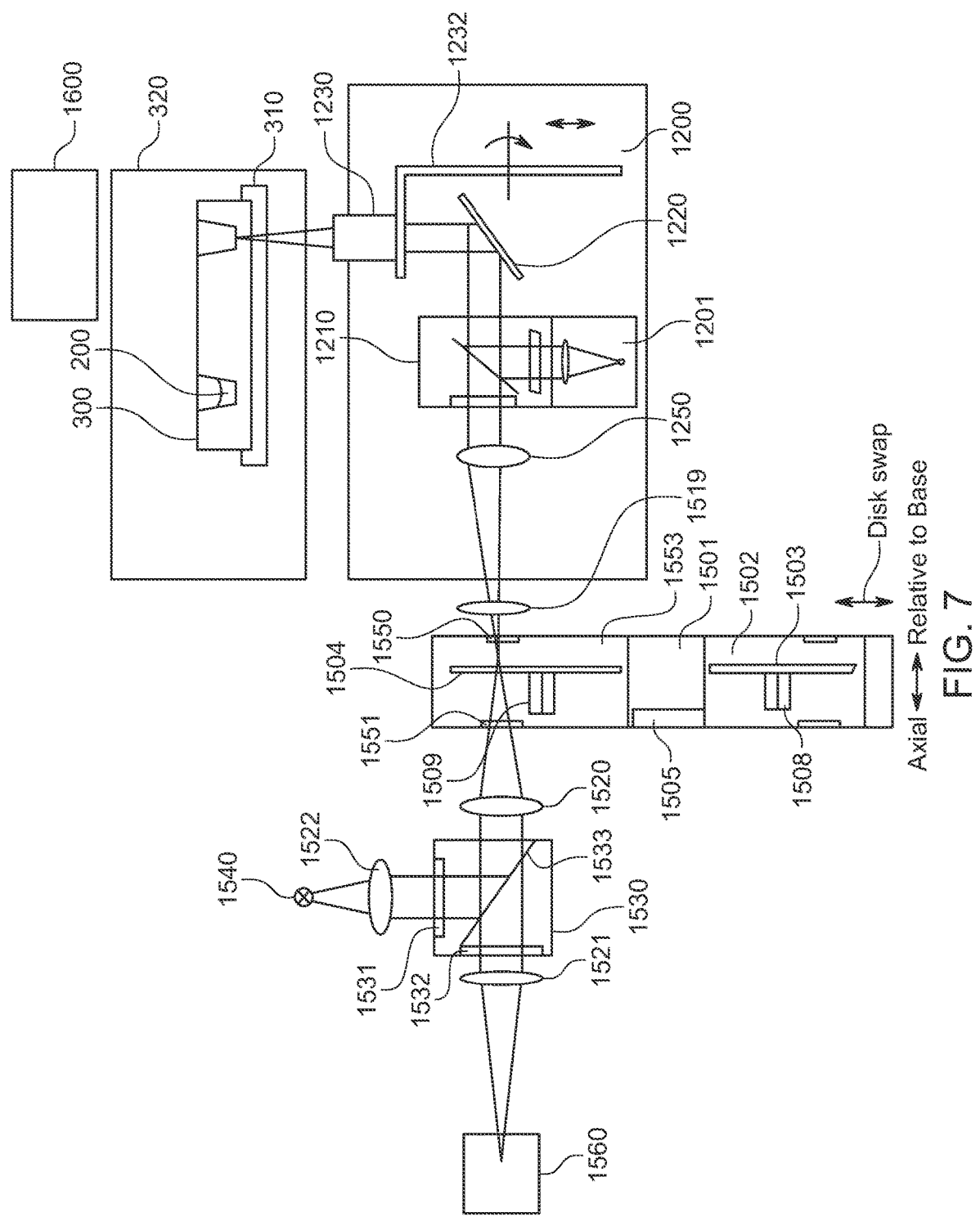
FIG. 7 is a block diagram illustrating a multi-detection system according to an embodiment.

FIG. 7 is a block diagram illustrating a multi-detection system according to an embodiment.

Several imaging modalities are made possible by the multi-detection system. Wide-field imaging in fluorescence, bright field, and phase contrast may be performed in additional to the confocal imaging modality. Optical elements of both the confocal imaging system and wide-field imaging systems are shown in FIG. 7.

A microplate 300 may be placed onto a microplate carrier 310 that positions the well 200 of interest in line with an imaging optical axis of the objectives 1230. An objective may be selected from among several objectives of various magnifications placed on an objective turret 1232. The relative position of the imaging illumination subsystem 1600 is illustrated in FIG. 7, and the imaging illumination subsystem 1600 may be used for bright field, color bright field, and phase contrast imaging to the sample. Many optical elements are shared between wide-field and confocal systems and more detailed description of such sections will be provided below in FIGS. 8 and 9, in which some elements of FIG. 7 are omitted for clarity.

Figure 8:
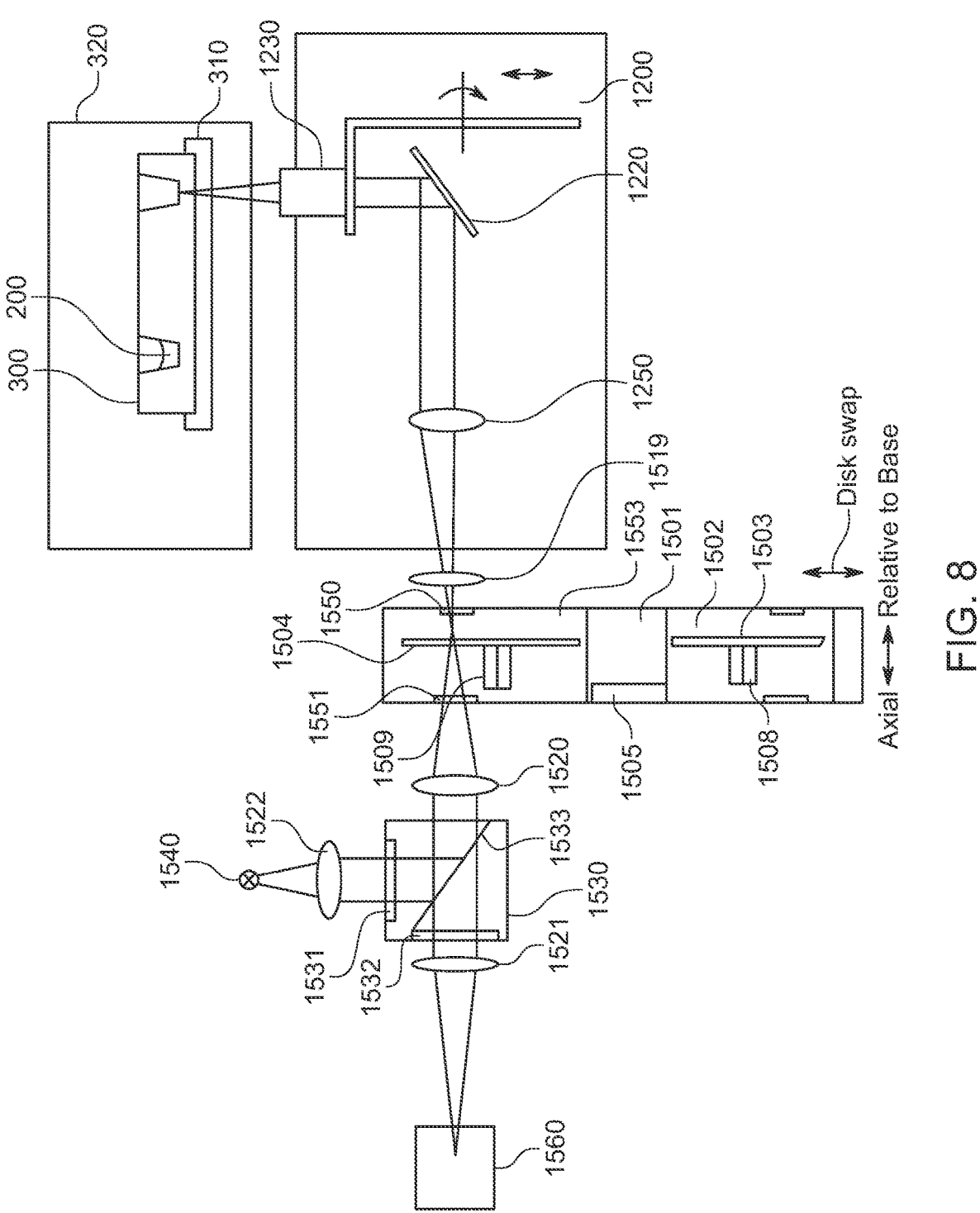
FIG. 8 is a block diagram illustrating a multi-detection system according to an embodiment.

FIG. 8 is a block diagram illustrating a multi-detection system according to an embodiment.

Confocal imaging as deployed as shown in FIG. 8. Wide-field imaging subsystem elements (e.g. LED cube 1201 and filter cube 1210) are automatically removed from the optical path to the sample and the system shown in FIG. 7 is transformed into the confocal optical system illustrated in FIG. 8, for understanding of the confocal light path.

Figure 10:
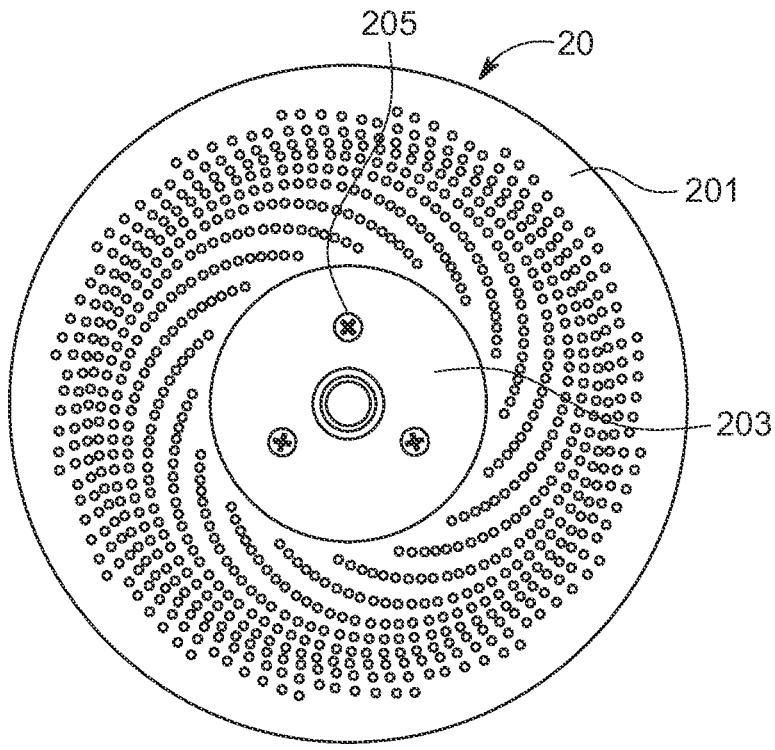
FIG. 10 is a diagram illustrating a spinning disk according to an embodiment.

A spinning disk confocal system is deployed as an example embodiment of the confocal imaging system. The system is based on utilizing a spinning disk (FIG. 10) the optical path. The disk is placed in the intermediate image plane conjugal to a sample and detection planes. The disk is thus both in the excitation light path and the emission light path. The disk is typically around 2 mm thick and made from glass or quartz, in an example embodiment. The disk may be coated to be non-transparent, or having a given transparency or opacity, except for clear areas left as a pattern of pin holes or slits. Ideally the disk surface is made to not reflect oncoming light. A sample to be imaged is illuminated by excitation light transmitted via the pin holes. Only radiation emitted by the sample, which is generated from these illuminated spots on the sample, reaches a detector via pin holes of the disk. The pin holes or slits, while many, are spaced far away from each other to act optically independently. The energy from adjacent pin holes does not ideally affect the sample spots illuminated by a given pin hole. The disk spot pattern is typically arranged in several spirals as shown in FIG. 10. The disk may be controlled to continuously spin, thus scanning the sample. As the disk rotates, the sample is illuminated one spot at time and the complete sample image is detected on the detector for reconstruction as a complete image of the sample.

Returning to FIG. 8, the confocal light source 1540 may be any light source suitable for confocal microscopy. For example the confocal light source 1540 may be a solid state light source, such as a light emitting diode (LED) or solid state laser or semiconductor-based laser (laser diode). In an example embodiment, the output tip of the optical fiber may be a light (radiation) source. Radiation is as an embodiment, as the excitation spectrum could be outside of 380-630 nm range that is commonly referred as light. However, the term "light source" is more commonly used in imaging, and the term light will be used interchangeably with radiation herein. The input tip of the fiber can be illuminated from a light source module external to the instrument to allow flexibility in selecting the best light source match for the sample imaging needs. The fiber also allows flexibility of bifurcating input from multiple external light sources. The output tip of the fiber is imaged by condenser 1522 onto or close to the intermediate sample image plane where spinning disk 1504 is located. The light from the fiber may be sent through excitation filter 1531 and then is reflected from the dichroic mirror 1533 and focused by the tube lens 1520 onto the spinning disk 1504. The term "lens" here and throughout the description may refer to a single lens or group of lenses depending on the embodiment and function, as appreciated by person skilled in the art. As discussed, the disk has a spiral pattern of holes of slits. A field lens 1519 minimizes the light loss and guides the light exiting the disk to be gathered by the tube lens 1250. The tube lens 1250 guides the excitation radiation into objective 1230 via mirror 1220. The objective 1230 illuminates the small spots on the sample near the bottom of well. The sample components have been stained with dye that corresponds to excitation wavelength. Those components are excited with oncoming radiation and emit radiation that typically has a longer wavelength. This emitted light is guided to the detector as follows.

Light emitted by a sample is collimated by objective 1230, and is reflected by mirror 1220 and gathered by tube lens 1250 and field lens 1519 onto spinning disk 1504. The intermediate image of the sample in emitted light is formed at the spinning disk 1504 surface. The tube lens 1520 and lens 1521 invert that image and form a sample image at the detector 1560. The detector 1560 is typically a pixilated digital camera, such as charged couple device (CCD) camera or complimentary metal-oxide semiconductor (CMOS) camera. The sample image is captured by the camera, and may be stored in memory of the multi-detection system or an external computing system, and could be enhanced and analyzed for various properties and/or presented to the user on a visual display.

A confocal cube 1530 (e.g., a confocal excitation/dichroic mirror/emission cube) is shown between the tube lens 1520 and lens 1521, which is an arrangement for fluorescence microscopy. The filters and dichroics may be thin film coatings on glass. Excitation filter 1531 forms a bandpass for excitation and emission filter 1532 forms a bandpass for emission, while the dichroic mirror 1533 separates excitation and emission to fully use the available energy and to suppress magnitude of excitation light reflected from multiple optical surfaces as excitation light travels towards the sample, including the disk surface, that reaches the detector. The lens 1521 (e.g. an emission filter) provides most of the excitation light suppression, but the dichroic mirror 1533 also plays a suppression role. An alternative arrangement for the described cube could be several filter wheels that carry excitation filters, emission filters and dichroics. In the exampled embodiment, cubes are a method of arranging the described elements, which allows very easy exchange by a user as imaging needs change. Several filter cubes (e.g. confocal cubes 1530) can be arranged on a motorized slider and could be identified either by setup in software performed by user or labelled electronically or optically with a code to be read automatically via bar code or some other automatic available method.

The surface of the spinning disk is imaged onto detector along with the sample. Thus, any dust particles that attach to the disk surface may show up as artifacts in the image, for example streaks of bright light due to disk rotation. The small particles can easily adhere to the disk surface with sufficient force that resists centrifugal forces. The spinning disk 1504 and the disk drive motor 1509 are part of a disk module 1553. The disk in the module is typically assembled in clean environment, like clean room, and is sealed from the ambient environment to prevent dust particles from settling on the disk. The windows 1551 and 1550 in the module allow light to pass through, but keep dust out. Ideally, these dust protection windows should be placed as far as feasible from the intermediate image plane so dust that could settle on the window glass does not result in artifacts in the image. The disks are fully contained within the disk modules 1502 and 1553. Thus, the user should not open the modules to avoid introducing particles of dust to the disk.

FIG. 8 illustrates two disk modules 1553 and 1502 installed in the multi-detection instrument. The disks can be moved to position one disk or another disk into the optical path. Alternatively, both disks can be moved out of the light path and space 1501 placed along the optical axis. This allows for wide-field imaging modality to be performed, such as fluorescence imaging, bright field imaging, or phase contrast imaging.

A great benefit of allowing both confocal and wide-field imaging options for the user in the same instrument is ability to overlay images in various imaging modalities, such as a wide-field image and the same image in confocal imaging modality, for example. Alternatively, a bright field image may be utilized to locate a region of interest that is then imaged confocally. For this arrangement to properly obtain an image, the magnification in both modalities should match exactly or the images do not overlay properly. The light in the section between the tube lenses 1520 and 1250 is not parallel. In confocal modality, several flat windows are present in the optical path in this section: confocal disk and dust protection windows. There is no need for these windows in the wide-field modality. But, to match optical path length in the non-parallel light path, the glass 1505 is added in the space 1501 between confocal disks through which wide-field imaging takes place. This assures that a sample remains in focus for a fixed objective position when the image modality changes. This assures that magnification in confocal and wide field imaging modes match. The thickness of glass 1505 should match the sum of flat windows of a disk used in confocal imaging (window 1551, spinning disk 1504, and window 1550). The glass 1505 should be placed as far as feasible from the intermediate image plane so dust that could settle on the glass does not result in artifacts in the image.

The pin hole size on the confocal disk is ideally selected based on the parameters of an imaging objective 1230. In an embodiment, the size of image of the disk pin hole made on the sample may be matched to the distance between the first two minima of the Airy diffraction pattern of objective. The formula for Disk pin hole size, as given in Zeiss "Introduction to Spinning disk microscopy," is $$\text{Disk pin hole diameter} = 1.2 * \text{Magnification of objective} * \text{Emission Wavelength/Numerical Aperture of Objective.}$$

Both numerical aperture (NA) of the objective and magnification are part of the formula. If a pin hole is too small, too much light is lost and time to take an image increases. If a pin hole is too large, the confocal effect can be reduced or lost altogether. Most commercial spinning disk microscopes feature non interchangeable spinning disk with pin holes in range 50-70 um. This works reasonably well as a compromise with the range of high magnification objectives typically deployed with confocal microscopy. But it is preferred, a disk with appropriate pin holes can be matched to the objective used.

Some spinning disk implementations do not possess a spiral pattern of round holes, but instead employ slit apertures. Slit apertures may provide a relatively brighter illumination of the sample and more intense emission signal, whereas pin hole apertures may provide relatively better axial resolution. Hence, for some imaging applications, including biological fluorescence application slits may be preferred to be able to reduce image acquisition times, which is another reason to change the disk even for a fixed objective.

Multiple disks may be deployed in the imaging instrument so that selection from among the disks may be performed by the user or automatically by the multi-detection system.

FIG. 8 illustrates an example of two disk modules 1502, 1553 used in the multi-detection instrument. All disk modules can be configured to be replaced by the user. The modules can be identified either by setup in software controlled by user or labelled electronically or optically with codes to be read automatically via bar code or some other available method, to enable automatic configuration by the multi-detection system.

One additional advantage from a modular disk module is the ability for the user to clean the windows 1551 and 1550, which may provide dust protection, when the disk module is removed from the instrument and both windows are easily accessible.

Module identification enables automated software setup and to automatically reset and calibrate the module axial position in the optical path. In the spinning disk confocal imager the disk surface plane, detector sensitive element plane and sample planes should be conjugate to each other. This means, if following emission rays from sample, the image of sample plane is coincident with the disk plane, and disk planes and sample planes images are coincident with the detector plane. The detector 1560 sensitive chip plane is fixed by camera design. The objective 1230 can be moved along the focusing axis to sharpen the sample image on the detector. Then, the disk should be ideally placed in the intermediate plane conjugal with both the detector and intermediate sample image plane for all three planes to be conjugate. In a proposed embodiment, a disk axial position is held very close to an ideal conjugate position by disk module design, but the final position of the disk surface can be adjusted automatically by observing the disk pattern on the detector and bringing this pattern into sharp focus on the detector. Multiple image based focusing methods are available and are well known in the industry. Once a best disk surface position is found, this position can be stored in software and memory, and associated with the disk module. If the disk module is removed and reinstalled, the correct disk position can be restored automatically by software. If a new disk module is introduced, the system will alternatively engage the disk focusing routine and will select the best axial position for the new disk module. The user thus can be relieved from keeping track of what disk module is deployed in the instrument, and the various positioning thereof.

Alternatively, if only a few disk modules are envisioned to be utilized, then a user can setup disk modules via a setup screen in the calibration section of a user interface of software included with the multi-detection system.

The two concepts of user replaceable disk module and automated axial disk positioning work best in tandem, but my be separately implemented. If automated axial disk positioning is unavailable, the disk modules may be configured to be interchangeable relative to the disk position and some datum on the module that assures proper placement in the instrument. The concept of easily replaceable disk modules, that user does not have to open and thus subject to environment, would still apply and bring benefit to the user who wants flexibility of multiple disks best suited for deployed imaging objectives and samples.

Even if disk modules are limited to one or two in the instrument, the automatic axial adjustment can be used to alleviate the need to strictly control location of the detector image sensor sensitive surface in the detector 1560 (e.g. camera). In the case to allow user maximum flexibility in camera selection and to also allow upgrade of camera within the multi-detection s system. If the sensor surface after camera replacement moved, the disk surface can be relocated automatically to be conjugate to sensor surface via image-based autofocus routine.

Figure 9:
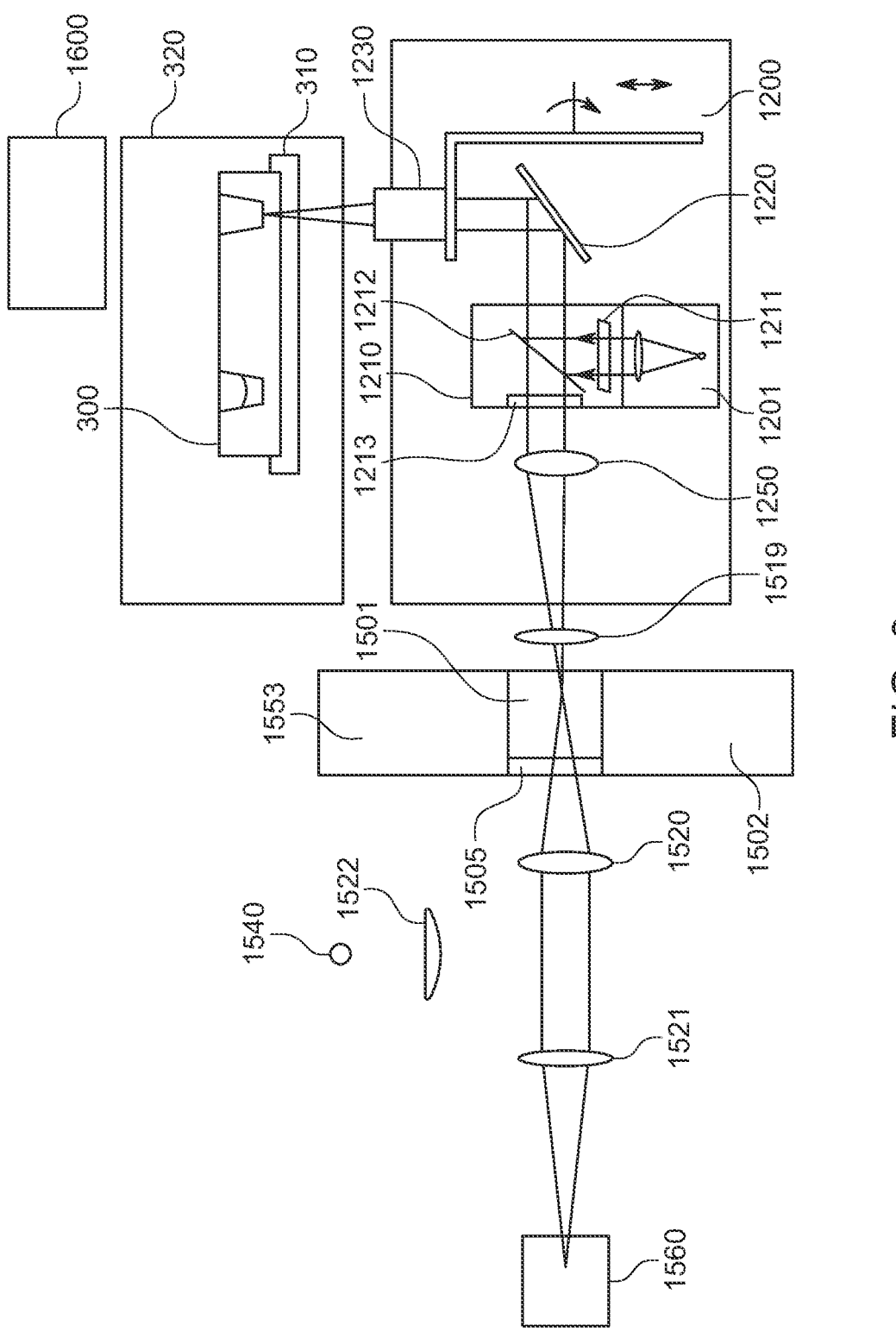
FIG. 9 is a block diagram illustrating a multi-detection system according to an embodiment.

FIG. 9 is a block diagram illustrating a multi-detection system according to an embodiment.

In FIG. 9, wide-field imaging as deployed in an example embodiment is illustrated. As described above, the optical section (with elements labelled 15xx) does allow both confocal imaging (with spinning disks 1504 or 1503 in optical path) and wide-field imaging (via space 1501 between the disks). But, there may be a shortcoming of using this optics and confocal light source 1540 and confocal cubes 1530 for wide-field modality the researcher may want to deploy in a single versatile instrument. For confocal imaging, the excitation radiation should be directed onto the disk via multiple optical elements (e.g. dichroic mirror 1533, tube lens 1520, window 1551) positioned prior to the disk surface. After the disk, excitation radiation is guided to the sample via more optical elements (e.g. window 1550, field lens 1519, tube lens 1250, mirror 1220, objective 1230). For confocal imaging, there is no choice to this scheme. But, on every surface encountered, some of excitation light is reflected back. Good design then relies on careful ray tracing to ensure that reflected light is kept from the detector as much as possible and on the emission filter 1532 to suppress the unwanted reflected light. The optical elements prior to the disk surface. as tube lens 1520 and window 1551. and the spinning disk 1504 surface are exposed to very strong level of excitation radiation that partially gets reflected. Also, any dust particles may get excited and will fluoresce. Despite the best intention of the designer, some of the light does come through to the detector and reduces signal to noise ratio. Thus, a non-fluorescing sample that should appear very dark on the image, may not appear very dark. This may be due to noticeable background signal due to reflected light, the effect that tends to be uniform across the image. For wide-field microscopy using the confocal section excitation elements described above in FIG. 8 would come with significant compromise in image quality and system capabilities.

In an example embodiment, an alternative subsystem is provided in the same instrument that can be used for wide-filed fluorescence imaging. Confocal cubes 1530 of a confocal subsystem are positioned out the way and spinning disk module gets positioned to the space 1501 for wide-field imaging. This transforms the configuration of FIG. 7 into the configuration of FIG. 9. The dedicated wide-field section elements are an LED cube 1201, and wide-field excitation/emission/dichroic imaging filter cube 1210. The excitation filter 1211, dichroic mirror 1212 and emission filter 1213 are mounted in a filter cube that typically will be matched with the LED cube 1201 for best signal to noise performance. Several of these cube pairs, corresponding to specific chemistry being investigated, can be provided on a slider.

There are several advantages to this design.

First, is that the LED excitation optics is much nearer to the sample, and thus excitation light encounters fewer optical surfaces on the way to sample. Reflections from those surfaces, that can reach the detector, are thus greatly reduced, and signal to noise in the image is improved.

Second, is the wide verity of LEDs used in LED cubes 1201 that are available in the market that may not be powerful enough to be used in the confocal optical tract, but can deliver sufficient excitation if placed closer to the sample as shown in FIG. 9.

Third, particularly important if sample has to be excited in UV range, is that some objectives are rated as UV objectives and transmit UV light and exhibit very low fluorescence when excited by UV. But, in general optical elements commercially available for the rest of optical tract, such as tube lenses, are not assured to be fluorescence free when illuminated by UV light. If a wide-field image of a sample stained with common DAPI nuclear stain is required, a common approach in the confocal optical tract is to use wavelength around 400 nm, and thus to avoid strongly exciting optical elements in addition to the sample. But moving excitation towards 400 nm from 360 nm, the wavelength that is ideal for DAPI stain excitation, reduces emitted light a great deal. A researcher would need to place higher concentration of dye in the sample or raise the detector gain, and thus reduce signal to noise of imaging. Ideally the excitation of DAPI stained sample will be done at 360 nm, but the UV excitation light will not pass through optical elements that may fluoresce. LED Cube 1201 and filter cube 1210 allow just such an optimum option in an example embodiment. The UV excitation enters only objective 1230 that can be selected to not fluoresce. The emitted light does pass back to detector via multiple optical elements common to confocal and wide field tract, but because emitted light is in the visible spectrum range, the optical elements the light encounter do not typically fluoresce at the level they do in UV light.

FIG. 9 shows a relative location of an imaging illumination subsystem 1600 for wide field imaging in non-fluorescing modalities. This can be bright field, color bright field with tri color LEDs switchable one at a time, or phase contrast illumination system with ring apertures that would be matched to phase contrast objectives.

Figure 11:
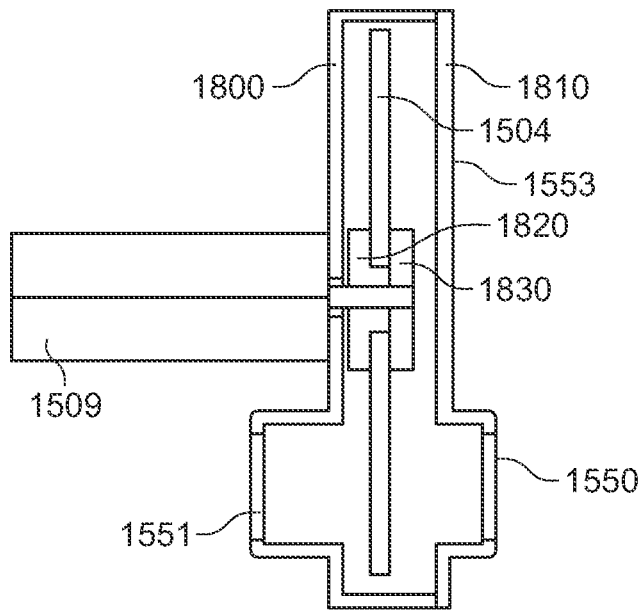
FIG. 11 is a diagram illustrating a confocal disk imaging module according to an embodiment.

FIG. 11 is a diagram illustrating a confocal disk imaging module according to an embodiment.

A disk drive motor 1509, a DC brushless motor in an example embodiment, capable of high rotational speed of several thousand RPM at a constant velocity, is mounted to the housing base 1800. The spinning disk 1504 is secured on the motor shaft by the hub parts 1820 and 1830. The cover 1810 mounts to the housing base 1800 to complete a dust free environment for the disk. There is no user access to the disk. Optical windows 1550 and 1551 allow light to pass therethrough while keeping an interior of the module dust free. It is advantageous from imaging standpoint to keep both windows as far away from disk plane as feasible, within overall space constrains, to avoid dust particles on the windows affecting the image. The disk module can be identified via bar code label, simple binary code label or some other instrument readable means so the multi-detection system can automatically identify which disk modules are present and available at any one time.

Referring to FIG. 10, there is a need to closely correlate the disk speed and confocal image exposure time. Multiple spirals are provided on the disk as seen in FIG. 10 and, as the disk rotates, the sample is swept by the pin hole pattern. There is a minimum angle of disk rotation required to sequentially, but completely, illuminate the sample once. For many commercial disks, and the disk of an example embodiment, this angle is 30 degrees. If the exposure time is not a multiple of times to move the disk 30 degrees, some artifacts like stripes becomes apparent in the image. This is well known problem in the industry. In an example embodiment the speed of disk rotation is set at 2400 rpm and the exposure time is set in multiples of one full revolution (e.g., 25 msec, 50 msec, 75 msec, etc.). This approach was found to result in a good compromise between image quality and minimum time to take an image. Also this approach, of using full revolution time exposure increments, resulted in minimizing image artifacts caused by potential non-concentricity between the disk spiral pattern and the disk rotational axis.

Figure 12:
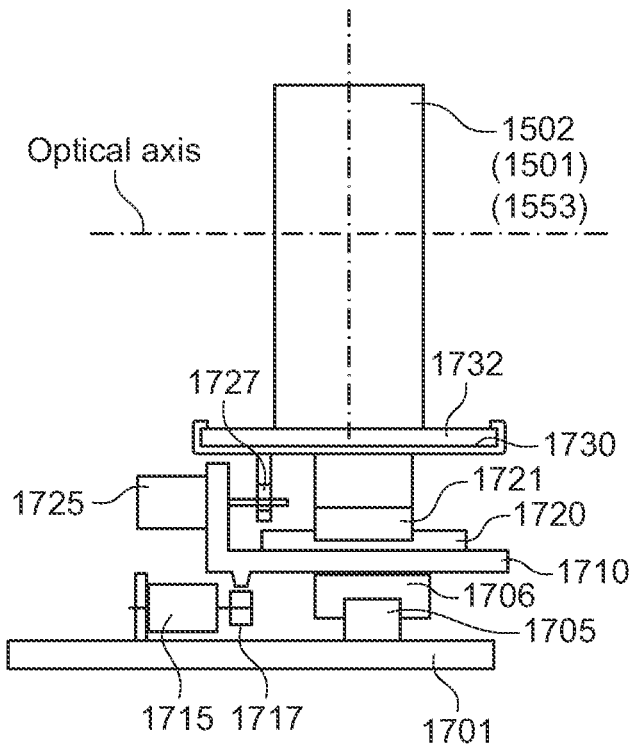
FIG. 12 illustrates a disk changing mechanism and a disk focus mechanism according to an embodiment.

FIG. 12 illustrates a disk changing mechanism and a disk focus mechanism according to an embodiment.

Referring to FIG. 12, the disk changing mechanism and disk focus mechanism may be implemented in an example embodiment. However, the configuration of the disk changing mechanism and the disk focusing mechanism are not limited thereto.

The base 1701 supports all elements of the mechanism. A linear way rail 1705, like part of an IKO or HTK guide system, is attached to the base 1701. The carriage 1706 of a linear way supports a bracket 1710. The bracket 1710 is translated by motor 1715 via timing belt 1717 in the direction perpendicular to the optical axis. The motion allows for either disk module 1502 or disk module 1553 or space 1501 to be positioned in alignment with the imaging optical axis. Other mechanical implementations are possible, the main advantage of the timing belt is the speed of change that is achievable with this particular method. The axis homing sensors and/or possible encodes are not illustrated for clarity.

The bracket 1710 in turn carries linear way rail 1720 and motor 1725. In an example embodiment, the motor shaft is shaped as a lead screw. The motor via lead nut 1727 translates the support 1730, attached to linear way carriage 1721 in a direction of optical axis to provide axial focus for the confocal disks. The axis homing sensors and/or possible encodes are not illustrated for clarity.

The disk modules can be attached to the support 1730 directly and accessed by user. The attachment could be via fasteners or via magnets for easy removal. Alternatively, disk modules could be attached to the guide 1732, which in turn could be slip fit and secured into support 1730 for easy removal from the instrument by user.

Other mechanisms can be deployed to accomplish the function of disk module access, positioning and disk focusing as will be understood by person familiar with the art.

Figure 13:
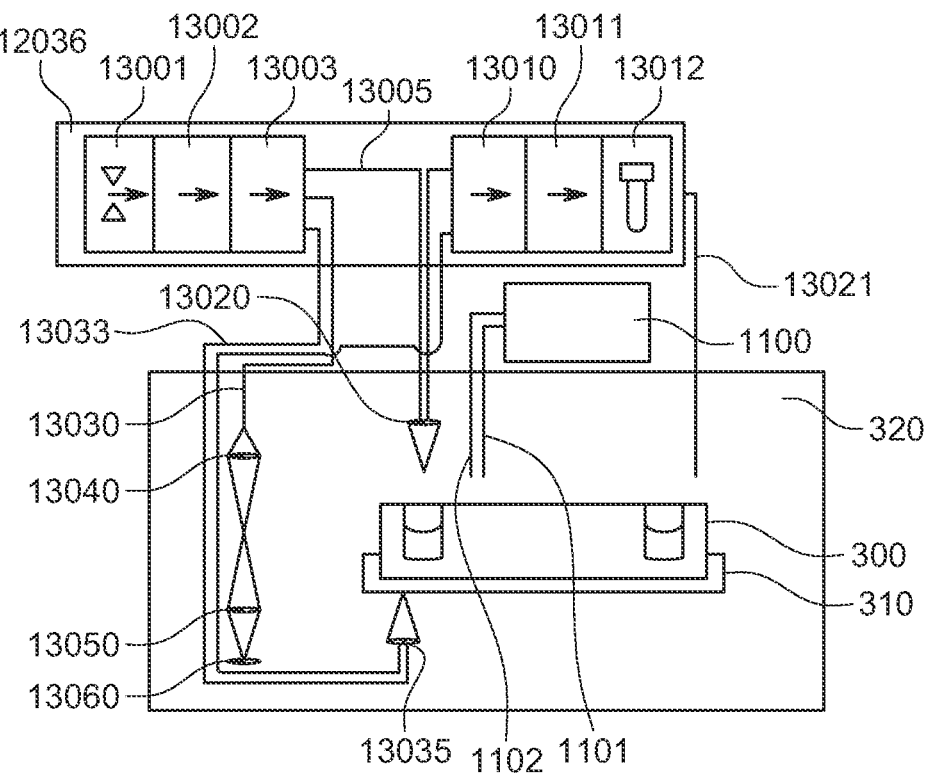
FIG. 13 is a diagram of a non-imaging analyzing subsystem according to an embodiment.

FIG. 13 is a diagram of a non-imaging analyzing subsystem according to an embodiment.

Referring to FIG. 13, the non-imaging analysis subsystem 1300 of the multi-detection system is provided.

The analytical modalities of the non-imaging analysis subsystem 1300 may be absorbance, fluorescence from top and bottom, and chemiluminescence. The Xe flash bulb 13001 emits radiation in the range 200-1000 nm. The two stages 13002 and 13003 of fluorescence excitation/absorbance dual monochromator select a narrow band pass of radiation. The radiation is guided towards sample by fiber optics cables to either absorbance channel via fiber 13030, top fluorescence via 13005 or bottom fluorescence via 13033. Only one fiber is acting at a time so there is no cross talk of light among various analytical modes. Absorbance is measured via lenses 13040 and 13050 by silicon detector 13060.

Top fluorescence excitation and emission pick up are performed via lens 13020, which can move up and down to accommodate various microplate and fluid levels. Bottom fluorescence is done in similar manner with lens 13055. Both top and bottom emissions are guided by fiber optics cables to the first stage of the emission dual monochromator 13010 and 13011 and then to photomultiplier 13012. The chemiluminescence fiber 13021 can be connected directly to the photomultiplier to offer measurements for very faint light via bypassing monochromator.

The fluid injection subsystem 1100 can provide researcher with ability to inject reagent via fluid lines 1112 and 1111 and rapidly measure results of injection by analysis subsystem further increasing range of test that can be performed in the instrument.

Figure 14:
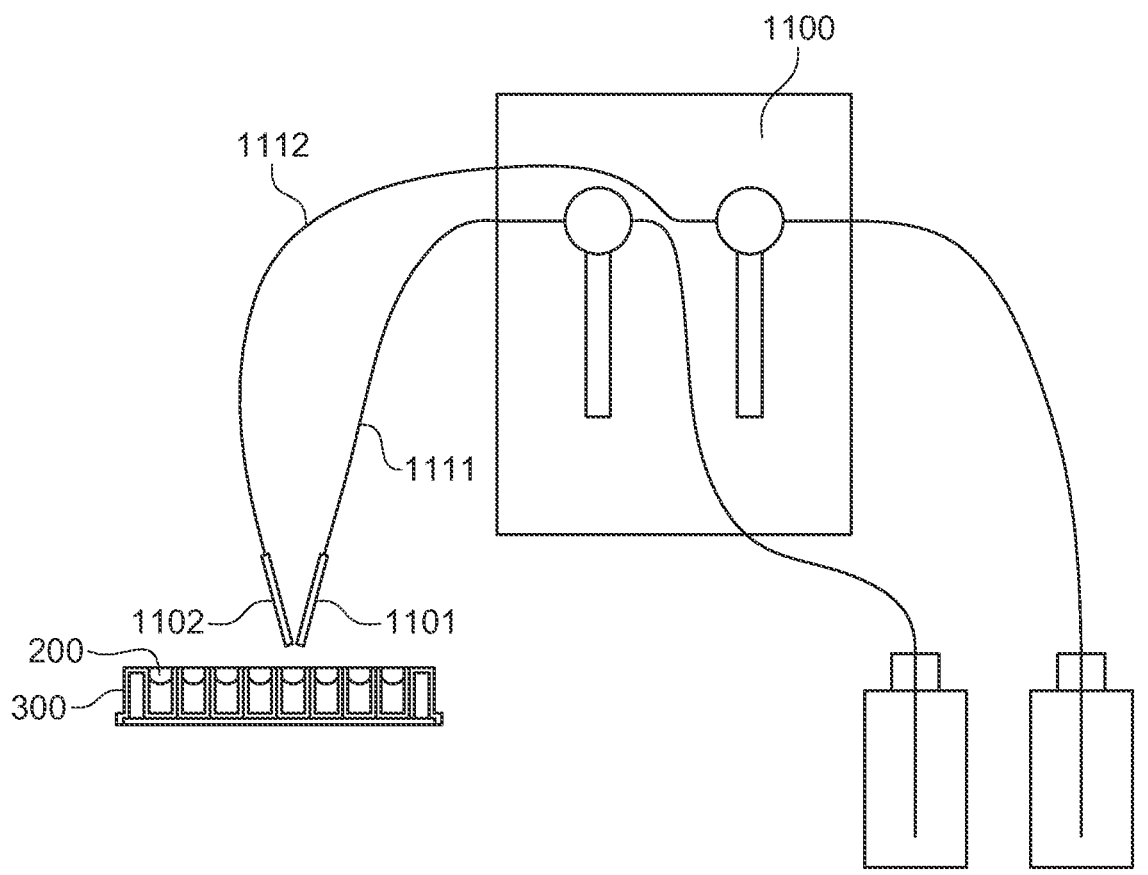
FIG. 14 is a diagram illustrating an injection subsystem according to an embodiment.

FIG. 14 is a diagram illustrating an injection subsystem according to an embodiment.

Figure 15:
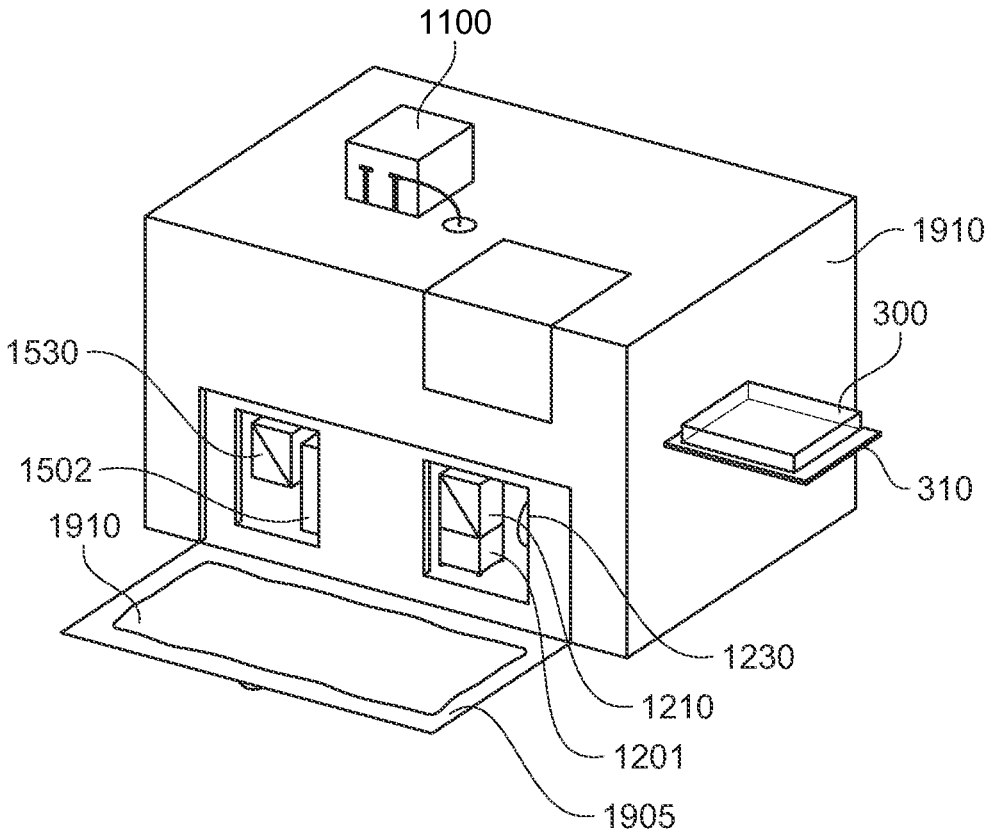
FIG. 15 is a diagram illustrating a multi-detection system according to an embodiment.

Referring to FIG. 14, an optional injection subsystem is provided. The injection subsystem 1100 can be placed on top of the multi-detection instrument, and fluid lines 1112 and 1111 fed through the bulkhead access in the top of the housing, as shown in FIG. 15. The reagents are delivered to microwells by pumps in the fluid injection subsystem 1100 via fluid lines 1111 and 1112 that can be PTFE lines, and into wells via injection needles 1102 and 1101, as shown in FIG. 14.

Referring to FIG. 13, environmental control may deployed in the multi-detection system.

The microplate carrier 310 supports the microplate 300 and is located in the incubation chamber 320, as shown in FIG. 13. This assures that microplate 300 is maintained at a desired temperature in all the positions of the microplate carrier 310 in the incubation chamber 320. The incubation chamber 320 can be constructed from material that well suited to maintain constant temperature, like continuous aluminum sheets, while still providing access to optical elements via small openings. The incubation chamber 320 is typically thermally insulated. The design of such chambers will be known to a person familiar with the art and from many multi-detection instruments. A common controlled temperature range may be from room temperature to the 65 C.

FIG. 15 is a diagram illustrating a multi-detection system according to an embodiment.

For live cells, the temperature is typically 37 C, but in addition control of gas around the sample is required. The control is accomplished by filling the complete housing 1910 of the instrument of FIG. 15 with appropriate gas mixture. The design avoids trying to contain the gas controlled environment to just measurement chamber or separation partitions. The aim of the design is to allow atmosphere within the housing 1910 to equalize. The design of the housing 1910 is thus made as gas tight as feasible by avoiding gaps in the housing and using soft gasketing material around user access doors.

Figure 16A:
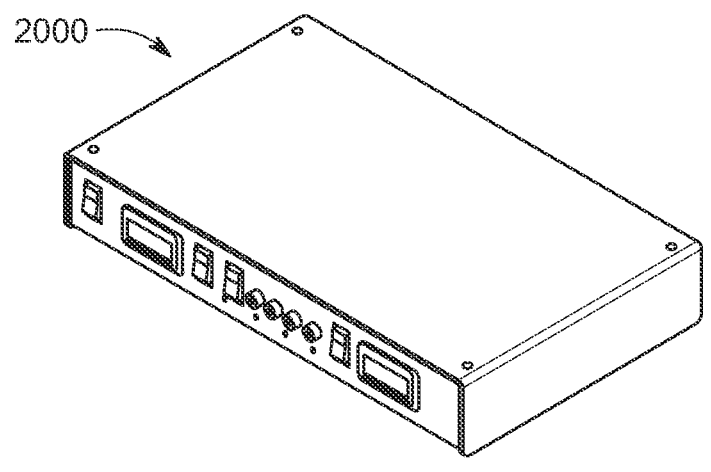
FIG. 16A is a perspective view illustrating an environmental control subsystem according to an embodiment.
Figure 16B:
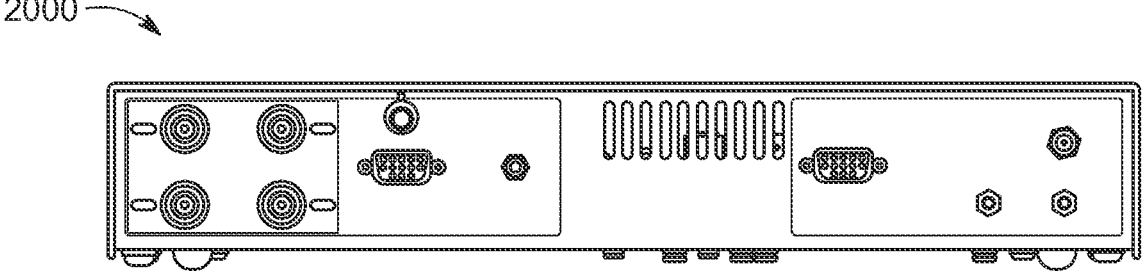
FIG. 16B is a rear view illustrating the environmental control subsystem according to the embodiment.
Figure 16C:
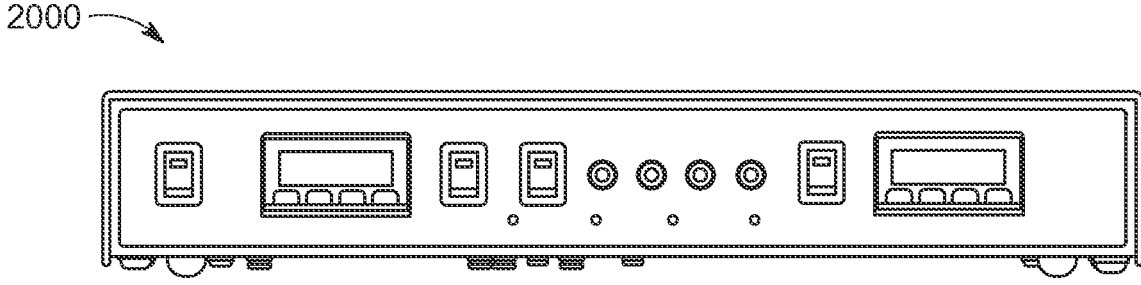
FIG. 16C is a front view illustrating the environmental control subsystem according to the embodiment.

FIG. 16 is a diagram illustrating a gas control subsystem according to an embodiment.

Referring to FIG. 16, an environmental control subsystem 2000 (e.g. a gas control subsystem) may be disposed external to the instrument. The environmental control subsystem 2000 allows a user to set $CO_2$ and/or $O_2$ concentration levels within the chamber to be different from a normal atmosphere: higher $CO_2$ and lower $O_2$. A gas sampling line connects the environmental control subsystem 2000 to the inside of the instrument housing. Based on composition of gas sampled or extracted from the instrument via the sampling line, the control systems may adjust flow of the $CO_2$ or $N_2$ gas being fed into the instrument, for example by the incoming gas being dispersed with small fan. This allows placement of all gas sensors and valves external to the main instrument and keeping complexity and reliability of gas control within external gas controller.

The combination of incubation chamber around the XY carrier travel zone and gas control of the atmosphere inside the housing, and thus around the microplate, provides user with ability to run long term live cell experiments.

Referring to FIG. 15, an outside view of the overall instrument and elements subject to user interaction with the instrument as implemented in the example embodiment is shown. The microplate carrier 310 presents itself to the user (shown at right) and a microplate 300 is placed onto the microplate carrier 310, for example by a user or robotics arm, and is then positioned within the multi-detection system. The access to confocal cubes 1530, wide-field LED cubes 1201, and wide field filter cubes 1210, confocal disk modules and objectives 1230 is via the front of the instrument via door 1905. Thus, facilitating the user access to most user changeable elements at once.

According to certain embodiments, objectives (e.g. objective 1230 or objective 2210) of the present disclosure may be fluid immersion objectives.

A way to improve optical performance in microscopy is to use fluid immersion objectives. In light microscopy, a fluid immersion objective is a specially designed objective lens used to increase the resolution of the microscope. According to embodiments of the present disclosure, the optical system is an inverted microscope, meaning that the objective is located under the sample and views the sample from underneath. In inverted microscope arrangements of the present disclosure, when performing fluid immersion, a drop of fluid (e.g. water or other fluid) is put on the objective and is held in place by the surface tension of the fluid. The objective is then brought to the sample, where the droplet is sandwiched between the sample and the objective. In this way, the light passing to and from the sample to the objective does not go through air. The higher refractive index of the fluid over air results in increased numerical aperture. This increases resolution and increases the signal level. According to embodiments, the objective may be brought to the sample, and then the drop of fluid is put on the objective.

In addition to water immersion objectives, objectives of the present disclosure may be provided with other types of fluid for increasing numerical aperture. Some examples of the fluid include, for example, oil and glycerol. In embodiments of the present disclosure, the fluid may be water, oil, glycerol, or some other type of fluid that would increase the refractive index.

Figure 19A:
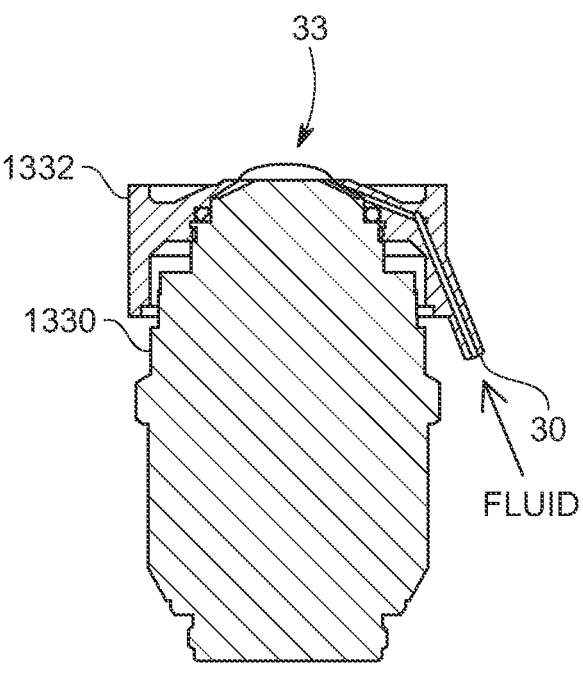
FIG. 19A is a first diagram illustrating a liquid immersion objective according to an embodiment.
Figure 19B:
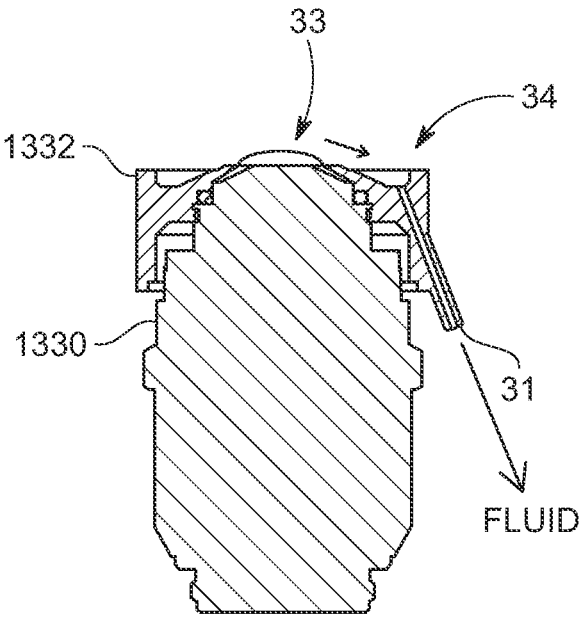
FIG. 19B is a second diagram illustrating the liquid immersion objective according to the embodiment.

With reference to FIGS. 19A-19B, a liquid immersion objective according to embodiments of the present disclosure is described below. According to embodiments, an objective 1330 may be provided with a sleeve 1332 that fits over the objective 1330. The sleeve 1332 may be configured to provide a fluid path in and out of the sleeve 1332. In addition, the sleeve 1332 helps hold a fluid droplet 33 in place. According to embodiments, the sleeve 1332 has a port for pumping fluid in and a port for pumping the fluid out. According to embodiments, as shown in FIGS. 19A-19B, the inlet and outlet port may be a same port 31. With reference to FIG. 19B, liquid droplet excess 34 may exit the sleeve 1332 through the port 31. In an example embodiment, the sleeve 1332 may be formed of, for example, anodized aluminum, plastic, or other materials.

Figure 20:
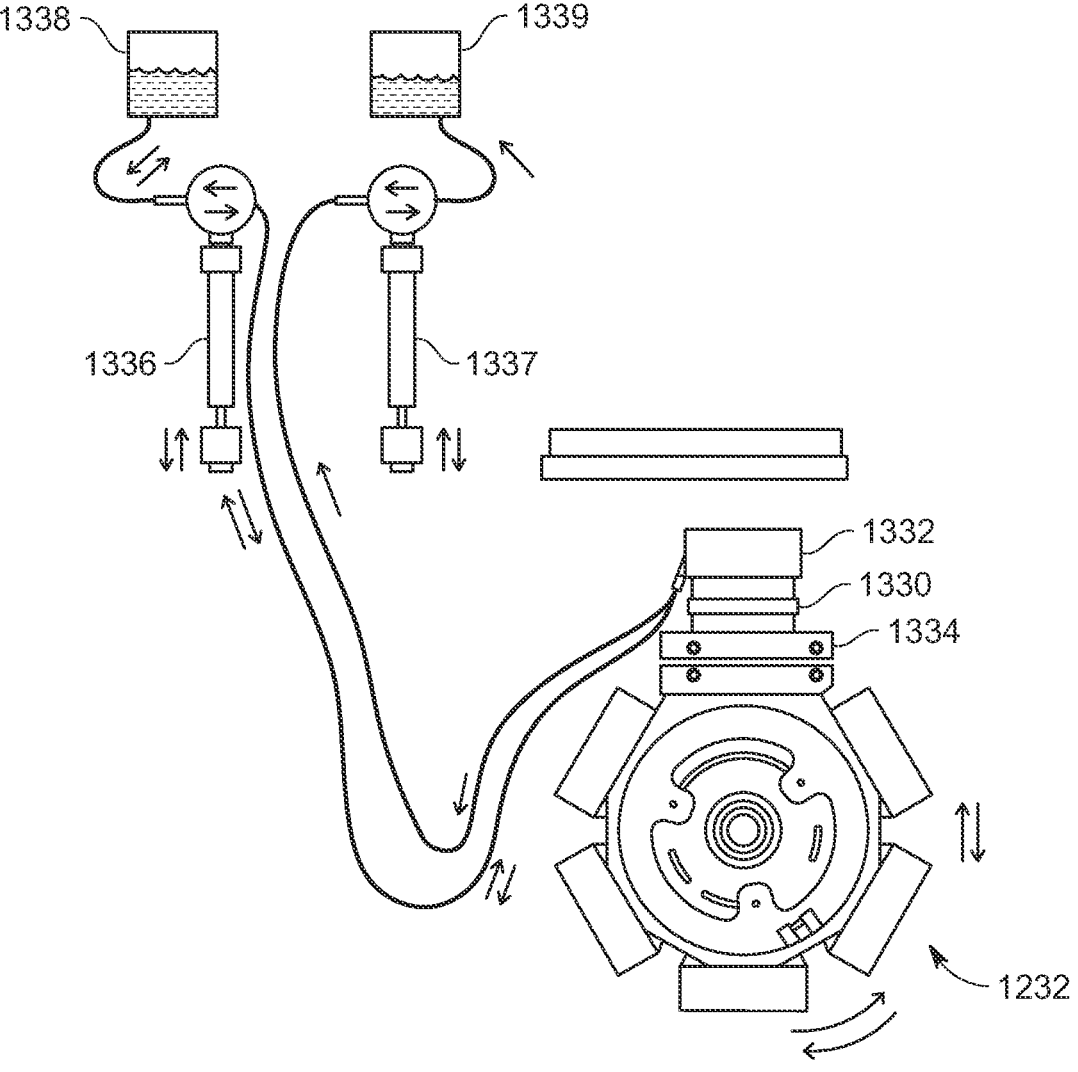
FIG. 20 is a diagram illustrating a fluid pump system according to an embodiment.

According to embodiments, with reference to FIG. 20, a fluid pump system may provided. The fluid pump system may include a first pump 1336, a second pump 1337, a first reservoir 1338 (a source reservoir), and a second reservoir 1339 (a waste reservoir), The fluid may be pumped by the first pump 1336 from the first reservoir 1338 to the head of the objective 1330. As shown in FIG. 20, the first pump 1336 may be a syringe pump. The fluid is then removed from the objective 1330 via the second pump 1337 pumping the fluid to the second reservoir 1339. The second pump 1337 may be referred to as a waste pump and may also be a syringe pump, as shown in FIG. 20. The first pump 1336 and the second pump 1337 may be other types of pumps that achieve the same or similar functionalities. The sleeve 1332 may be fit to the objective 1330, guide the fluid to the top of the objective 1330, and help to hold the fluid droplet in place. The sleeve 1332 may also have a waste port in which the fluid may be configured to be removed from the sleeve 1332. The objective 1330 may be a specially designed objective optimized for fluid (e.g. water) immersion application. In FIG. 20, the first reservoir 1338 and the second reservoir 1339 are shown as separate source and waste reservoirs, respectively. However, according to embodiments, a single reservoir may be provided, instead of the two separate reservoirs, in which the fluid could be reused. Additionally, the pumps may be multipurpose. For example, the BioTek C10 product has a fluidics dispense module that may be used to dispense reagents into the sample. This same dispense module could be configured to have additional purposes (including the purpose of the first pump 1336 and/or the second pump 1337) so as to reduce cost.

With further reference to FIG. 20, the objective 1330 may be attached to the objective turret 1232 by an objective coupling 1334. Description of the objective coupling 1334 is provided below with reference to FIG. 21.

Figure 21:
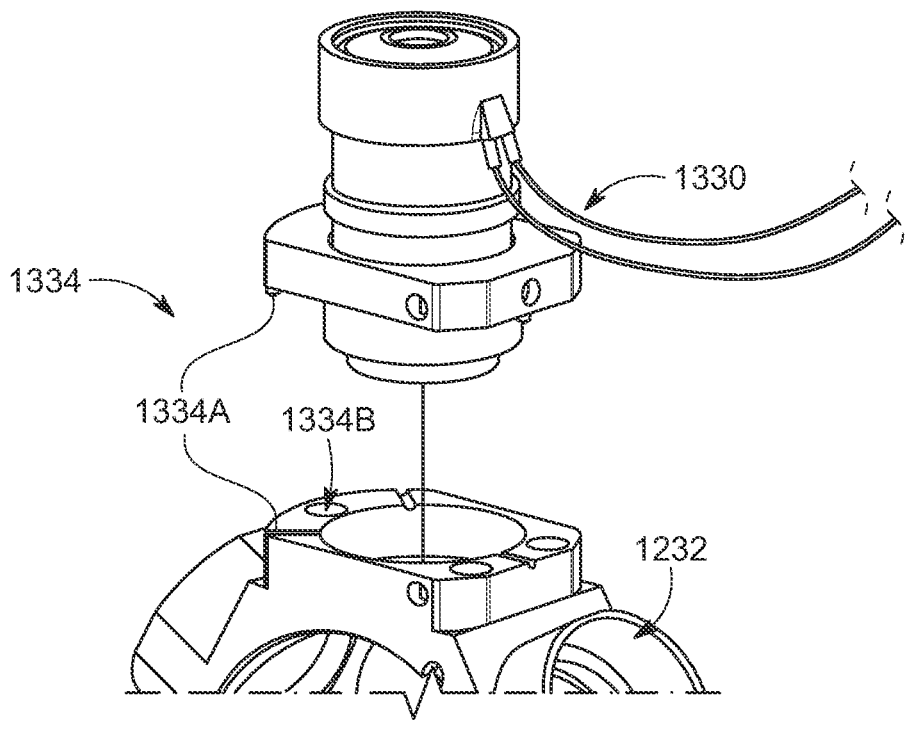
FIG. 21 is a diagram illustrating an objective coupling according to an embodiment.

As shown in FIG. 21, the objective coupling 1334 may include kinematic connections 1334A and magnets 1334B that are configured to couple together the objective 1330 and the objective turret 1232. For example, the objective 1330 may be provided with at least one from among a protrusion or recess as a first part of kinematic connections 1334A, and the objective turret 1232 may be include at least one of the other from among the protrusion or recess as a second part of the kinematic connections 1334A that corresponds to the first part. The magnets 1334B may be provided with one or more of the objective 1330 and the objective turret 1232. According to embodiments, both the objective 1330 and the objective turret 1232 may be provided with the magnets 1334B that correspond to each other and are configured to connect to each other via a magnetic force. In other embodiments, only one from among the objective 1330 and the objective turret 1232 may be provided with the magnets 1334B, which may be configured to connect to a magnetic material (e.g. a metal) provided with the other from among the objective 1330 and the objective turret 1232.

According to comparative embodiments, objectives may be screwed into an objective turret. However, the use of a sleeve and tubing with an objective may make screwing the objective into an objective turret difficult in at least some embodiments. The use of an objective coupling 1334 that includes kinematic connections 1334A and magnets 1334B, according to embodiments of the present disclosure, enables an objective with a sleeve and tubing to be easily installed.

According to embodiments, with reference to FIGS. 22A-25C, the objective 1330 and sleeve 1332 may have various configurations. According to embodiments, the sleeve 1332 may also be referred to as a cap.

Figure 22A:
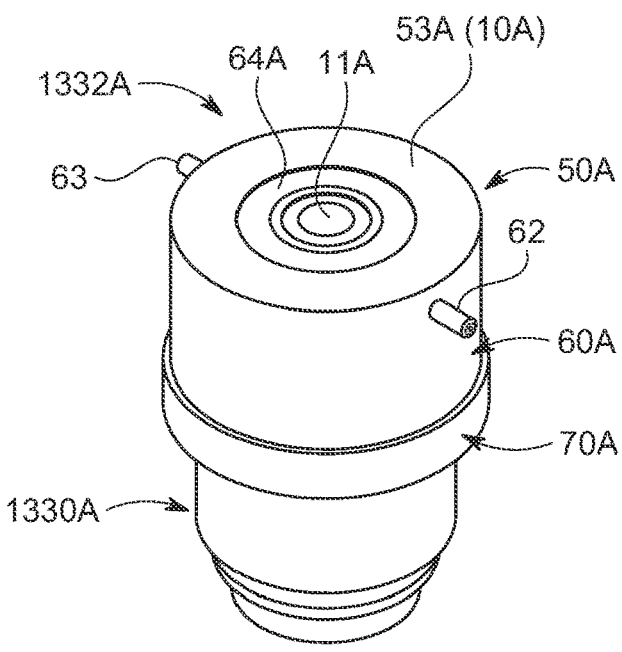
FIG. 22A is a perspective view illustrating a liquid immersion objective according to a first embodiment.
Figure 22B:
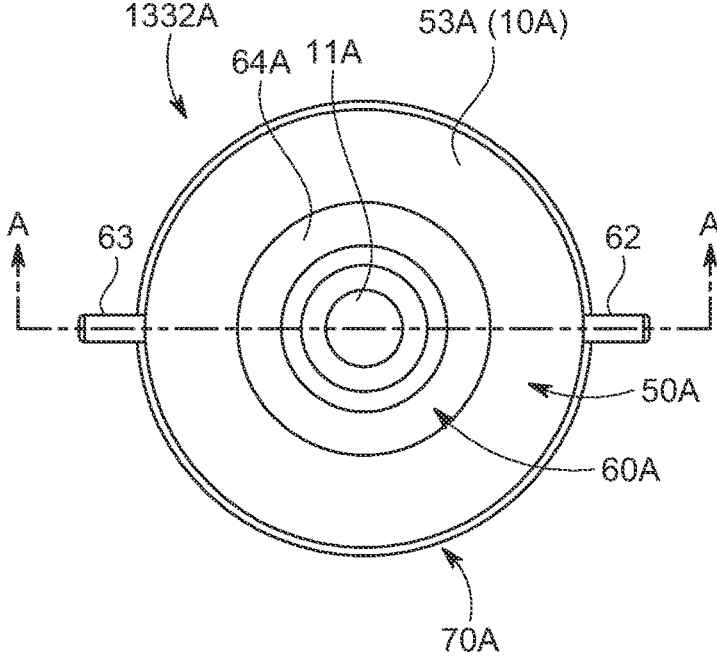
FIG. 22B is a top view illustrating the liquid immersion objective according to the first embodiment.
Figure 22C:
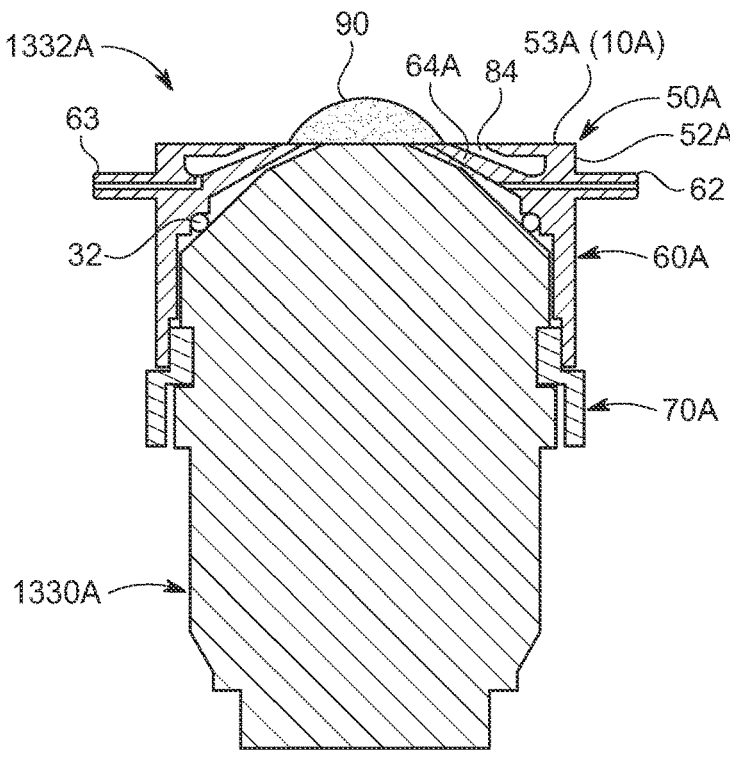
FIG. 22C is a first cross-sectional view, taken along line A-A in FIG. 22B, illustrating the liquid immersion objective according to the first embodiment in a state in which a liquid bulb is provided.
Figure 22D:
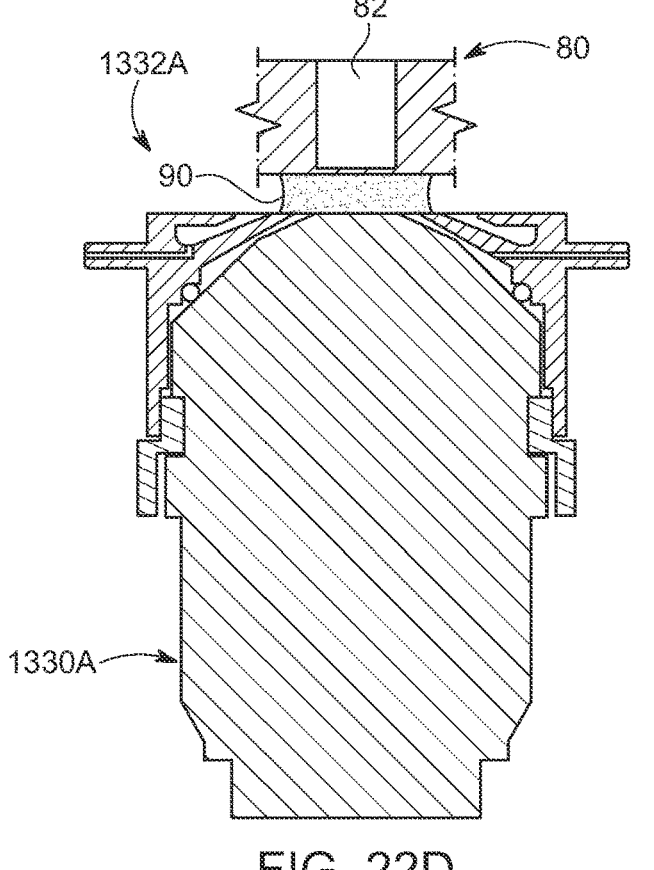
FIG. 22D is a second cross-sectional view, taken along line A-A in FIG. 22B, illustrating the liquid immersion objective according to the first embodiment, over which a microplate is provided.
Figure 23A:
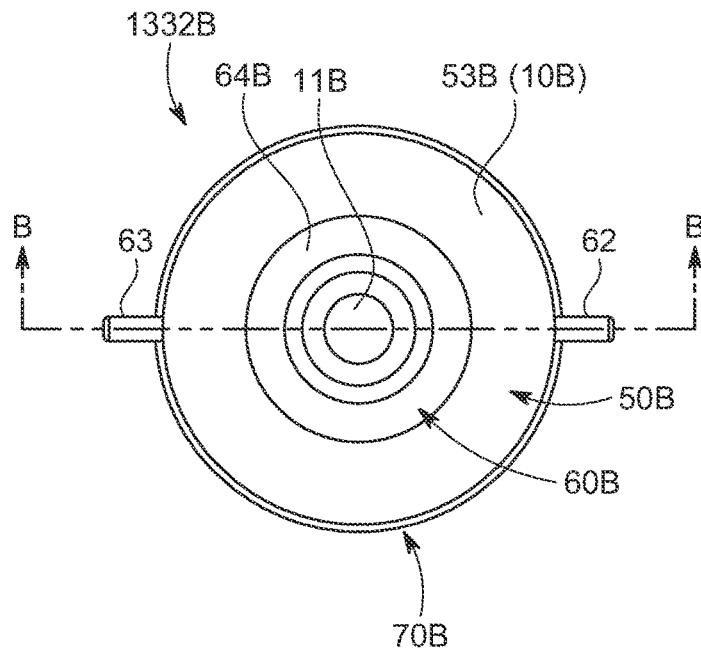
FIG. 23A is a top view illustrating a liquid immersion objective according to a second embodiment.
Figure 23B:
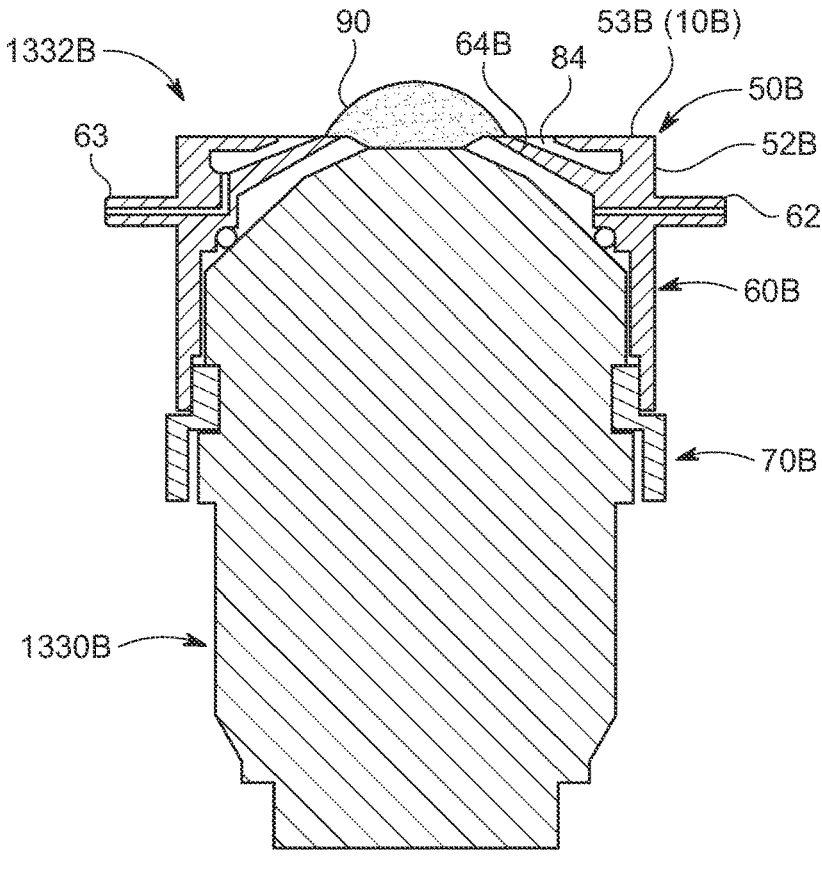
FIG. 23B is a first cross-sectional view, taken along line B-B in FIG. 23A, illustrating the liquid immersion objective according to the second embodiment, in a state in which a liquid bulb is provided.
Figures 23C, 24A:
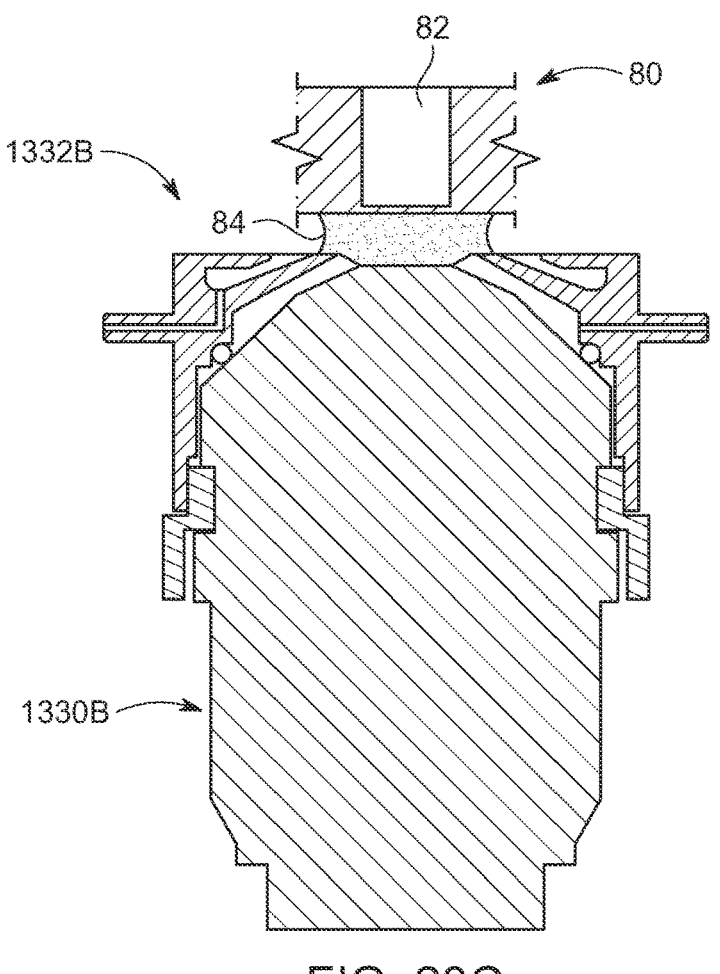
FIG. 23C is a second cross-sectional view, taken along line B-B in FIG. 23A, illustrating the liquid immersion objective according to the second embodiment, over which a microplate is provided.
FIG. 24A is a top view illustrating a liquid immersion objective according to a third embodiment.
Figure 24B:
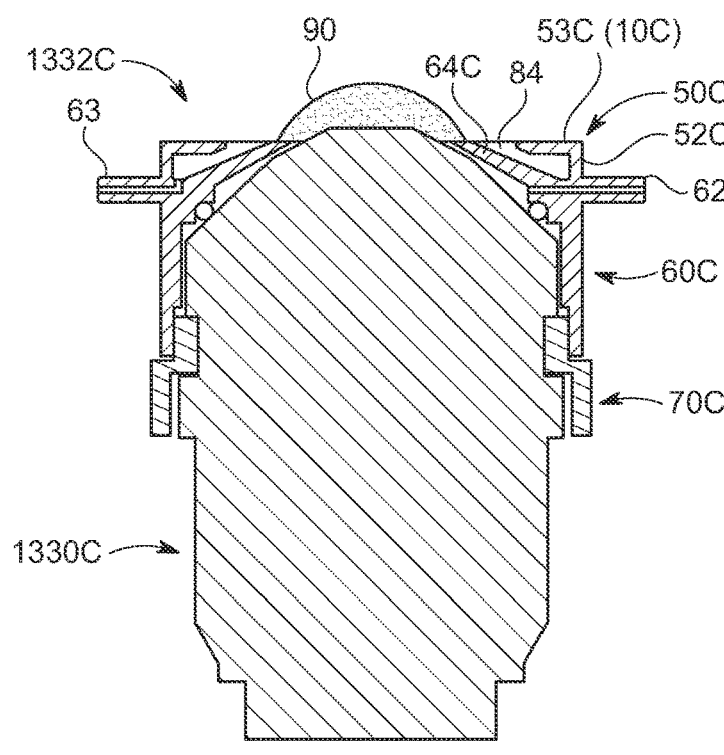
FIG. 24B is a first cross-sectional view, taken along line C-C in FIG. 24A, illustrating the liquid immersion objective according to the third embodiment, in a state in which a liquid bulb is provided.
Figure 24C:
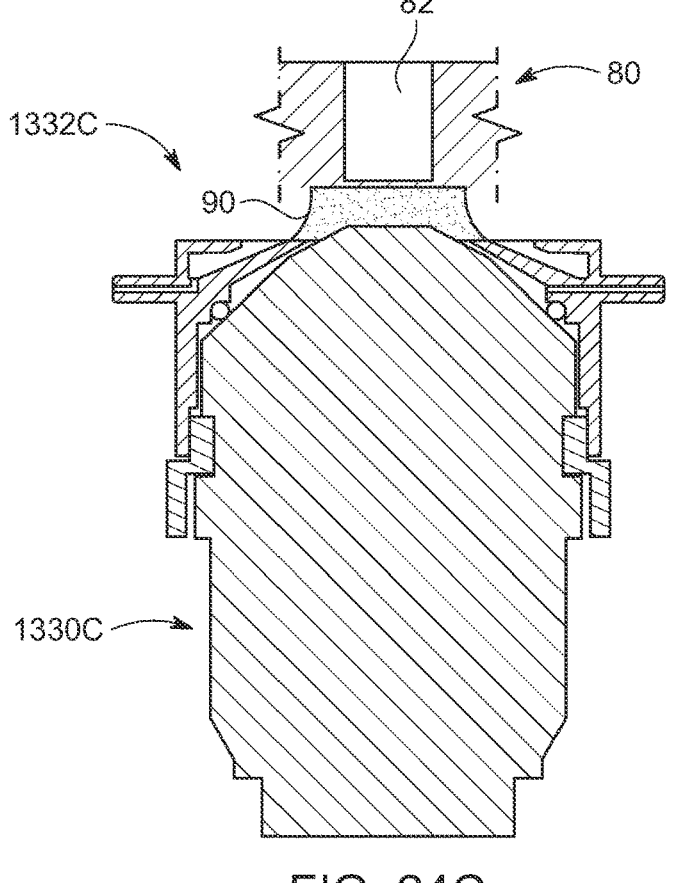
FIG. 24C is a second cross-sectional view, taken along line C-C in FIG. 24A, illustrating the liquid immersion objective according to the third embodiment, over which a microplate is provided.
Figure 25A:
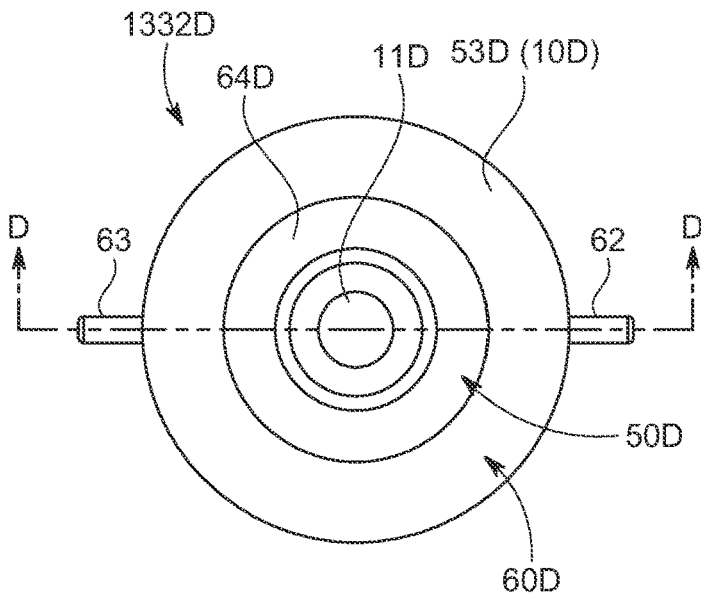
FIG. 25A is a top view illustrating a liquid immersion objective according to a fourth embodiment.
Figure 25B:
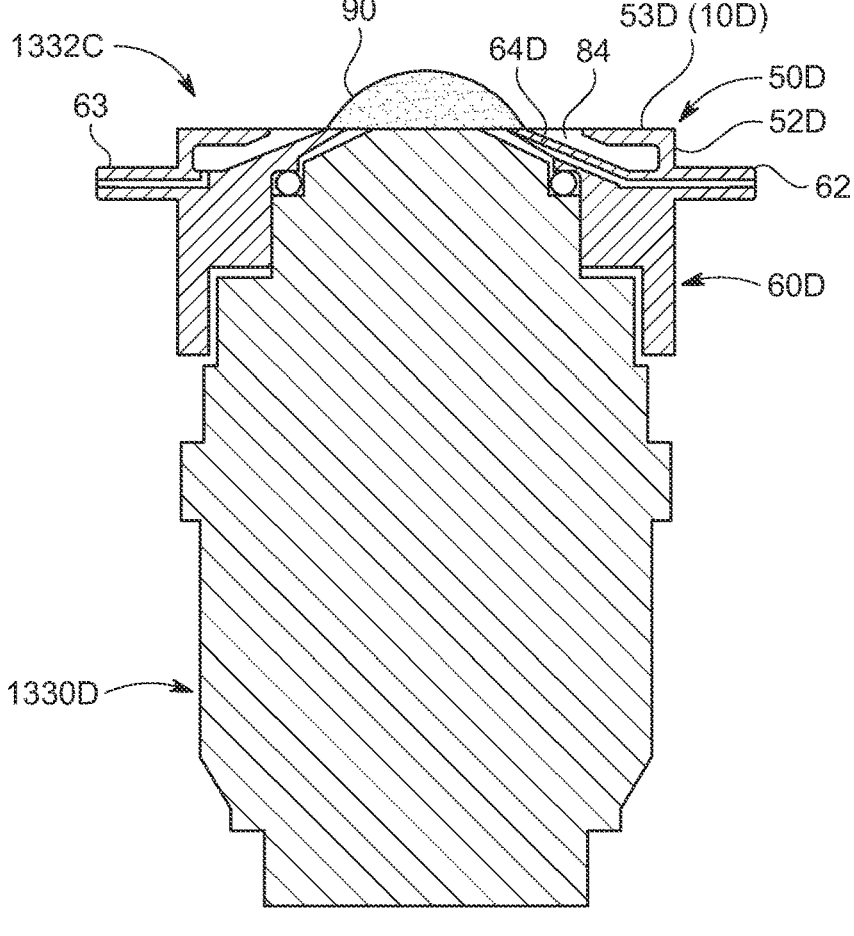
FIG. 25B is a first cross-sectional view, taken along line D-D in FIG. 25A, illustrating the liquid immersion objective according to the fourth embodiment, in a state in which a liquid bulb is provided.
Figure 25C:
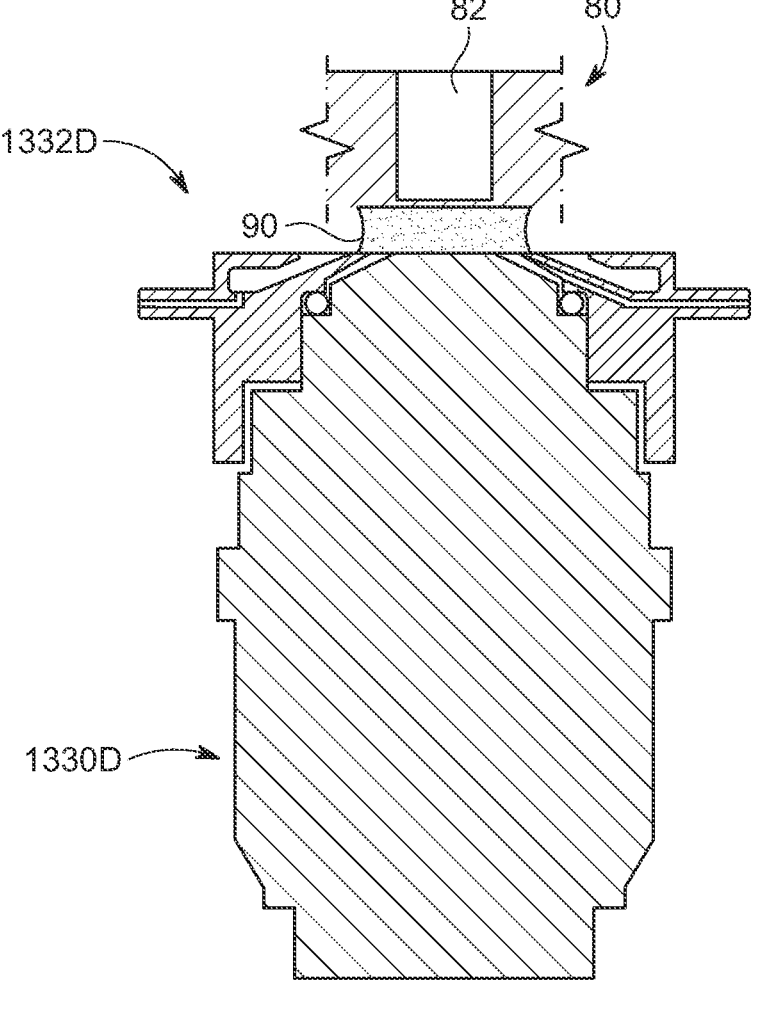
FIG. 25C is a second cross-sectional view, taken along line D-D in FIG. 25A, illustrating the liquid immersion objective according to the fourth embodiment, over which a microplate is provided.

FIG. 21 is a diagram illustrating an objective coupling according to an embodiment; FIG. 22A is a perspective view illustrating a liquid immersion objective according to a first embodiment; FIG. 22B is a top view illustrating the liquid immersion objective according to the first embodiment; FIG. 22C is a first cross-sectional view, taken along line A-A in FIG. 22B, illustrating the liquid immersion objective according to the first embodiment in a state in which a liquid bulb is provided; FIG. 22D is a second cross-sectional view, taken along line A-A in FIG. 22B, illustrating the liquid immersion objective according to the first embodiment, over which a microplate is provided; FIG. 23A is a top view illustrating a liquid immersion objective according to a second embodiment; FIG. 23B is a first cross-sectional view, taken along line B-B in FIG. 23A, illustrating the liquid immersion objective according to the second embodiment, in a state in which a liquid bulb is provided; FIG. 23C is a second cross-sectional view, taken along line B-B in FIG. 23A, illustrating the liquid immersion objective according to the second embodiment, over which a microplate is provided; FIG. 24A is a top view illustrating a liquid immersion objective according to a third embodiment; FIG. 24B is a first cross-sectional view, taken along line C-C in FIG. 24A, illustrating the liquid immersion objective according to the third embodiment, in a state in which a liquid bulb is provided; FIG. 24C is a second cross-sectional view, taken along line C-C in FIG. 24A, illustrating the liquid immersion objective according to the third embodiment, over which a microplate is provided; FIG. 25A is a top view illustrating a liquid immersion objective according to a fourth embodiment; FIG. 25B is a first cross-sectional view, taken along line D-D in FIG. 25A, illustrating the liquid immersion objective according to the fourth embodiment, in a state in which a liquid bulb is provided; and FIG. 25C is a second cross-sectional view, taken along line D-D in FIG. 25A, illustrating the liquid immersion objective according to the fourth embodiment, over which a microplate is provided.

In the below description of FIGS. 22A-25C, the same or similar features are given the same or similar reference characters. For purposes of clarity, redundant descriptions of same or similar features may be omitted.

With reference to FIGS. 22A-D, a top surface 10A of a sleeve 1332A may be flush with a top surface 11A of a lens of an objective 1330A, and the sleeve 1332A may be configured to clamp to the objective 1330A.

The sleeve 1332A may include, for example, an upper portion 50A, a middle portion 60A, and a lower portion 70A. According to embodiments, the upper portion 50A, middle portion 60A, and the lower portion 70A may be separately or integrally provided with each other so as to constitute a single body or a plurality of bodies. According to embodiments, two from among the upper portion 50A, middle portion 60A, and the lower portion 70A may be integrally provided so as to constitute a single body, while the other from among the upper portion 50A, middle portion 60A, and the lower portion 70A may be separately provided as a separate body that is configured to attach to the other two. According to embodiments, the upper portion 50A, the middle portion 60A, and/or the lower portion 70A may be subdivided into separate bodies, and/or additional bodies may be provided. According to embodiments, any number of the upper portion 50A, the middle portion 60A, and the lower portion 70A may be formed of aluminum.

According to embodiments, any number of the upper portion 50A, the middle portion 60A, and the lower portion 70A may be formed to substantially exhibit rotational symmetry around a center axis of the objective 1330A. The center axis may be, for example, an optical axis of the objective 1330A.

The middle portion 60A may be provided above the lower portion 70A. The middle portion 60A may include an inlet port 62 and an outlet port 63. Fluid may be pumped into the sleeve 1332A via the inlet port 62, and pumped out of the sleeve 1332A via the outlet port 63, by a fluid pump system (e.g. refer to FIG. 20). The inlet port 62 and the outlet port 63 may be provided separately from each other, on opposite sides of the sleeve 1332A. However, the position of the inlet port 62 and the outlet port 63 is not limited to such configuration, and may be variously modified. According to embodiments, the inlet port 62 and the outlet port 63 may be constituted by a single port.

The middle portion 60A may further include a tapered portion 64A that follows a contour of the objective 1330A For example, the tapered portion 64A may extend upwards and radially inward from an outer portion of the middle portion 60A. The tapered portion 64A may be formed to substantially exhibit rotational symmetry around the center axis of the objective 1330A. According to embodiments, the tapered portion 64A may have shapes other than a taper, so long as the shape follows a contour of the objective 1330A. The shape (e.g. inverted "V" shape that follows a contour of the objective 1330A) of the tapered portion 64A enables a liquid droplet 90 to have a desired shape on the objective 1330A for liquid immersion. According to embodiments, the tapered portion 64A may alternatively be referred to as a protruding portion.

According to embodiments, the inlet port 62 may include a passageway that extends through the tapered portion 64A, to an internal side of the tapered portion 64A, such as to be configured to supply the liquid for the liquid droplet 90 into a space between the objective 1330A and the tapered portion 64A.

The upper portion 50A may include a body. For example, the body may include a side wall 52A that extend upwards from the middle portion 60A, and a top wall 53A that extends radially inwards from the side wall 52A. The side wall 52A and the top wall 53A may substantially extend at 90 degrees from each other. However, an angle is not limited thereto, and may be variously modified according to embodiments. The body, including the side wall 52A and the top wall 53A, may be formed to substantially exhibit rotational symmetry around the center axis of the objective 1330A.

A groove 84 may be formed by and between the upper portion 50A and the middle portion 60A. For example, the groove 84 may be defined by an inner surface of the top wall 52, an inner surface of the side wall 53, and an outer surface of the tapered portion 64A. According to embodiments, the groove 84 may be formed to substantially exhibit rotational symmetry around the center axis of the objective 1330A. The groove 84 may be configured to receive and contain excess amounts of the liquid. According to embodiments, the groove 84 may communicate with the outlet port 63, such that excess amounts of the liquid in the groove 84 exit the sleeve 1332A via a passageway of the outlet port 63 that communicates with the groove 84.

With reference to FIGS. 22C-D, at least an upper surface of the top wall 53A may constitute the top surface 10A of the sleeve 1332A that is flush with the top surface 11A of the lens of the objective 1330A. According to embodiments, a top surface of the tapered portion 64 may also be flush with the top surface 11A of the lens of the objective 1330A.

According to embodiments, one or more o-rings 32 may be provided between the sleeve 1332A and the objective 1330A. For example, an o-ring 32 may be provided between the middle portion 60A and the objective 1330A. The o-ring 32 may be configured to seal a bottom-side of the space in which liquid is received between the objective 1330A and the tapered portion 64A.

With reference to FIG. 22D, a microplate 80, that holds a sample in at least one well 82, may be provided directly above the sleeve 1332A and the objective 1330A. The liquid droplet 90 on the lens of the objective may come into contact with a bottom surface of the microplate 80, at a position directly below the well 82. The microplate 80 may correspond to, for example, microplate 300 described in the present disclosure, or other microplates.

With reference to FIGS. 23A-C, a top surface 10B of a sleeve 1332B may be above a top surface 11B of a lens of an objective 1330B, and the sleeve 1332B may be configured to clamp to the objective 1330B.

The sleeve 1332B may include, for example, an upper portion 50B, a middle portion 60B, and a lower portion 70B.

The middle portion 60B may include a tapered portion 64B, and the upper portion 50B may include a body that includes a side wall 52B and a top wall 53B. At least an upper surface of the top wall 53B may constitute the top surface 10B of the sleeve 1332B that is above the top surface 11B of the lens of the objective 1330B. According to embodiments, a top surface of the tapered portion 64B may also be above the top surface 11B of the lens of the objective 1330B, and flush with the top surface of the top wall 53B.

With reference to FIGS. 24A-C, a top surface 10C of a sleeve 1332C may be below a top surface 11C of a lens of an objective 1330C, and the sleeve 1332C may be configured to clamp to the objective 1330C.

The sleeve 1332C may include, for example, an upper portion 50C, a middle portion 60C, and a lower portion 70C.

The middle portion 60C may include a tapered portion 64C, and the upper portion 50C may include a body that includes a side wall 52C and a top wall 53C. At least an upper surface of the top wall 53C may constitute the top surface 10C of the sleeve 1332C that is below the top surface 11C of the lens of the objective 1330C. According to embodiments, a top surface of the tapered portion 64C may also be below the top surface 11C of the lens of the objective 1330C, and flush with the top surface of the top wall 53C.

With reference to FIGS. 25A-C, a top surface 101) of a sleeve 1332D may be flush with a top surface 11D of a lens of an objective 1330D, and the sleeve 1332D may be configured to screw onto the objective 1330D.

According to an embodiment, an internal surface of the sleeve 1332D and an external surface of the objective 1330D may include screw threads that correspond and engage with each other such that the sleeve 1332D and the objective 1330D can be attached to and detached from each by a rotating motion of at least one of the sleeve 1332D and the objective 1330D.

The sleeve 1332D may include, for example, a first portion 60D and a second portion 50D.

The first portion 60D may include a tapered portion 64D, and the second portion 50D may include a body that includes a side wall 52C and a top wall 53C. At least an upper surface of the top wall 53D may constitute the top surface 10D of the sleeve 1332D that is flush with the top surface 11D of the lens of the objective 1330D. According to embodiments, a top surface of the tapered portion 64D may also be flush with the top surface 11D of the lens of the objective 1330D.

According to embodiments, an internal surface of the first portion 60D and may include the screw threads.

According to embodiments, the top surface 10D of the sleeve 1332D may be above or below the top surface 11D of the lens of the objective 1330D. For example, the top surface of the top wall 53D may be above or below the top surface 11D of the lens of the objective 1330D, and the top surface of the tapered portion 64D may be flush with the top surface of the top wall 53D.

According to embodiments of the present disclosure, various embodiments of confocal microscopy may be alternatively or additionally provided. For example, a laser point scanning confocal system may be provided. Laser point scanning confocal microscopy may include focusing a single point of laser light through a small aperture (pinhole) and scanning sequentially across the sample point by point in a zig-zag pattern. The sample fluoresces, and the light is sent back through the optical system. The light then may be read point by point by a detector, which may be a Photo Multiplier Tube (PMT) but could also be detected using other light measurement sensors. The signal from the sensor may be recorded point by point, and each point may constitute a single pixel in an image. There are advantages and disadvantages to a laser point scanning system over a spinning disk confocal. Laser point scanning systems have typically been slower than spinning disk confocals and thus, in many cases, were not appropriate for high throughput applications or live cell images. On the other hand, laser point scanning confocal systems penetrate deeper in the sample and provide belier axial and lateral resolution. Recently, there have been improvements made to laser point scanning systems to increase speed and thus are starting to rival spinning disk speeds while still providing increased depth penetrations. The speed of the laser point scanning confocal system is limited by the scanning speed of the motors that drive a scanning mirror of the system.

According to embodiments, confocal subsystems of the present disclosure may comprise both a laser point scanning confocal and a spinning disk confocal. The spinning disk confocal system may be used for live sample imaging and high throughput application, while the laser point scanning confocal system may be used to penetrate deeper into a sample with increased resolution. Like how one could use wide field imaging or other measurement modalities to provide a "hit", embodiments of the present disclosure may implement spinning disk confocal to quickly scan through a 3D sample and locate some point of interest. The laser point scanning system may then be used to take a more detailed image of the area of interest. Both laser point scanning confocal systems and spinning disk systems are available on the market as two separate instruments. However, there are several problems with using two separate instruments in such a manner. For one, the cost of both spinning disk and laser confocal microscopes would make putting a workflow as described above impractical. Additionally, there is the technical problem of relocating to a region of interest on an alternate microscope. With both a laser point scanning confocal system and a spinning disk system implemented in a same instrument, a "hit" could be found, and then the optical system could switch and scan the region of interest without moving the stage. Finally, there is also an issue of studying live cells, whereby the sample changes over time. Moving a sample to a different instrument takes too long relative to the speed of the changing biology. When moving the sample to another instrument, the "hit" region of interest may have changed and may no longer be relevant.

Another advantage to having both a laser point scanning confocal and a spinning disk confocal in a same instrument is that one can leverage the laser point scanning confocal system, not for imaging, but for targeting a specific area of the sample to photobleach it. The laser point scanning confocal system and specific control over an X-Y scanning mirror, provided therein, allows for targeting of a very small and specific area of the sample with the laser. This may be one spot or a block defined in a zig-zag scanning. Then, once the photobleaching has occurred, the instrument may be quickly switched to the spinning disk confocal to monitor the Fluorescence Recovery after PhotoBleaching (FRAP). Some specific applications include: (a) analysis of molecule diffusion within the cell (e.g. studying F-Actin diffusion in primary dendritic cells after a region of interest has been photobleached); (b) quantifying fluidity of bio membranes (e.g. membrane fluidity in *C. elegans*); and (c) analysis of protein binding (e.g. monitoring dynamic binding of chromatin proteins in vivo).

The pinpoint accuracy of laser point scanning confocal systems combined with the speed of imaging of a spinning disk system, according to embodiments of the present disclosure, solves an unmet market need in FRAP assays.

With reference to FIGS. 22A-22B, a configuration according to embodiments of the present disclosure that includes a laser point scanning confocal system, a spinning disk confocal system, and wide field functionality in a single instrument is described below. However, embodiments of the present disclosure may include any combinations of the above systems and functions.

FIG. 22A illustrates a case where the instrument is set to the laser point scanning confocal (LSC) modality. FIG. 22B illustrates a case where the instruction is set to the wide field or spinning disk confocal modality. According to embodiments, a mechanism may be provided to switch between the LSC system and the wide field or spinning disk confocal system. As shown in FIGS. 22A-B, elements in block 2220 are movable and enable the switch between laser point scanning optics and spinning disk/confocal. For example, block 2220 may be a plurality of disk modules which may be moved for selection between disks (and therefore modalities) as described in the present disclosure.

With reference to FIG. 22A, embodiments of the present disclosure may include a laser point scanning confocal system. Light, typically from a laser source, enters such system at a light input device 2201. The light input device 2201 may be, for example, a fiber-coupled input or a directly coupled laser without a fiber. The light is then collimated when passed through a lens 2202. The light then hits the long pass dichroic 2203. The long pass dichroic 2203 is designed to reflect the input light and allow for the passing of the emission light at a high wavelength. It is typical that the light source would have multiple input wavelengths.

Embodiments of the present disclosure may support an automated means of switching the long pass dichroic 2203 to accommodate the input wavelength. The light is then reflected off the scan mirror 2204. The scan mirror 2204 may be controlled with two-axis motors 2205 and 2206. In some embodiments, the motors are both Galvo type motors and, in other embodiments, one motor is driven by Galvo, and the other motor is a resonant scanner. The resonant scanner is much faster than the Galvo motor but allows for less control over the positioning. Both types of motors are known to those skilled in the art. According to embodiments, the scan mirror 2204 may configured as a plurality (e.g. two) of separate scan mirrors. For example, the plurality of separate scan mirrors may include a first mirror configured for x-scanning and a second mirror configured for y-scanning, wherein positioning of each of the separate scan mirrors may be, for example, controlled by a respective motor.

After the light is reflected off the scan mirror 2204, the light then goes through a focusing lens 2207, and then a tube lens 2208. The light then travels to a reflecting mirror 2209, objective 2210, and finally to sample 2211, wherein a spot illuminated on the sample may be tiny. Then, assuming that the sample is fluorescent, the light travels backward through the laser point scanning system, and goes to the long pass dichroic 2203. Provided that the emission light is in the passband of the long pass dichroic 2203, it will pass through to the focusing lens 2213 and then through a pinhole 2214. The pinhole 2214 may be a single-size pinhole, or it may be variable in size. Variation in size may be achieved by having multiple pinholes on a selector wheel or a variable iris. The light then goes through lens 2215 and then to dichroic 2216.

The arrangement shown in FIG. 22A includes a dual PMT 2218 setup that would enable the measurement of multiple emission wavelengths simultaneously. The arrangement could be extended out to be an additional number of PMTs 2218. It could also be a single PMT 2218 arrangement where the emission wavelength is selected via a version of the dichroic 2216 and EM filter 2219 that includes a switching mechanism. The switching mechanism could be a cube and a slider or multiple wheels, both of which would be understood by those skilled in the art.

In laser point scanning systems, the light input device 2201 location may need precise alignment with the pinhole 2214. This makes implementation, installation, and maintenance of a laser point scanning system challenging. It is typical that, after shipment or maintenance, adjustment may need to be made to realign the pinhole 2214 to fiber location. A solution to this problem is that both the light input device 2201 (e.g. fiber optic input) and pinhole 2214 are on a motorized axis, and the instrument (e.g. controller thereof) can automatically align the light input device 2201 and the pinhole 2214 by controlling corresponding motors. Such aspect may provide benefits for after shipment, maintenance, or even with thermal changes in the instrument. In addition, the fiber input location may be smaller than the pinhole size so that there is some margin in the design. With automated alignment, the pinhole size could be reduced and thus increase confocality of the system, thereby increasing resolution and sample penetration.

Figure 17:
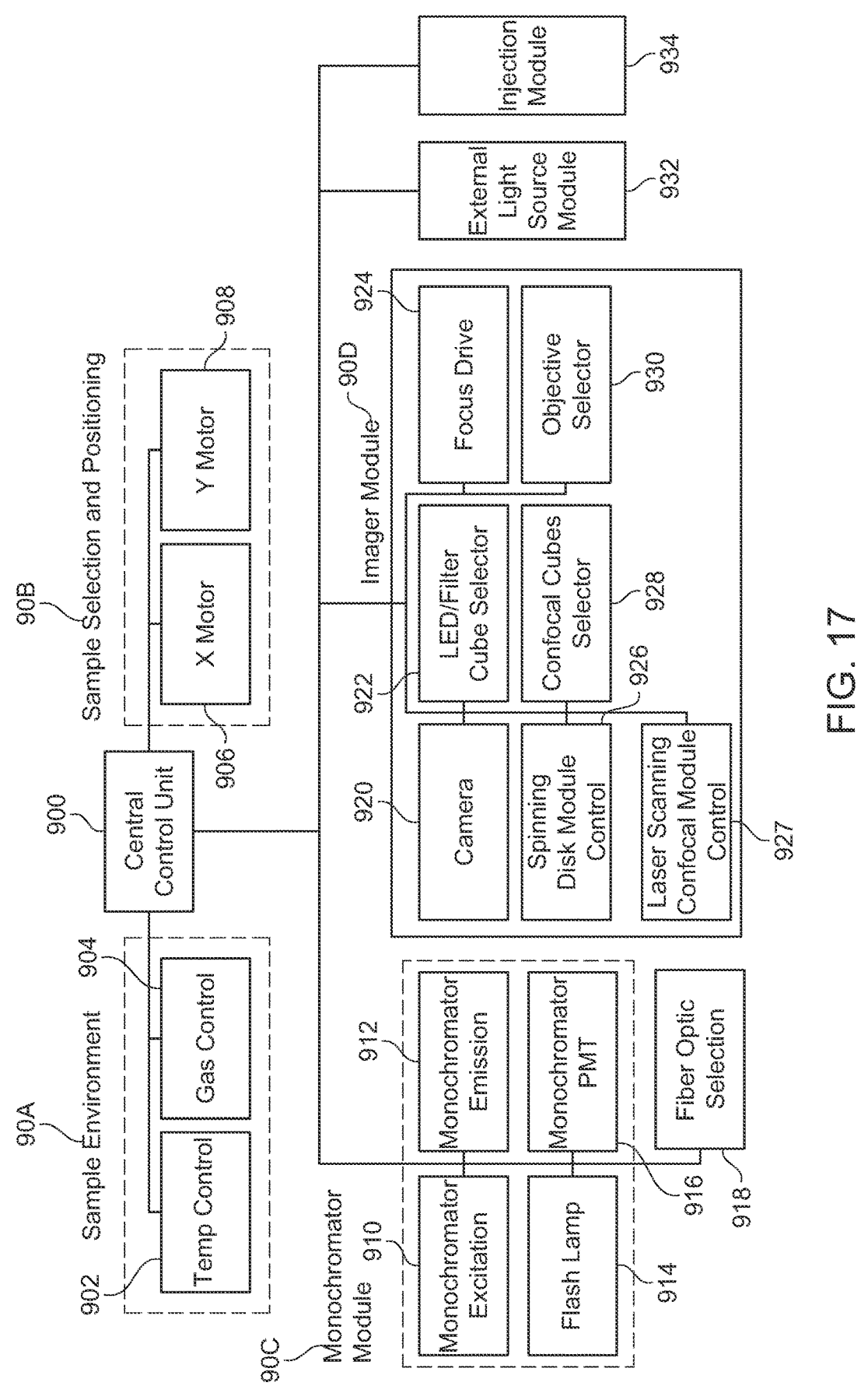
FIG. 17 is a functional block diagram that illustrates the control of modalities of the instrument according to an embodiment.

FIG. 17 is a functional block diagram that illustrates the control of modalities of instruments according to embodiments.

The operation of modalities may be controlled by a central control unit (e.g., processor, CPU, microprocessor, etc.). According to embodiments, the central control unit may also be referred to as a controller (e.g. controller 1000).

The central control unit 900 may be connected to communicate with and control elements of embodiments of the present disclosure. For example, the central control unit 900 may be connected to communicate with and control elements of the sample environment 90A, elements of sample selection and positioning 90B, elements of the monochromator module 90C, elements of the imager module 90D, an external light source module 932, and an injection module 934.

Elements of sample environment 90A under control may provide temperature control (902) and gas control (904) as described above.

Sample selection and positioning 90B may be controlled through the use of motors for positioning samples in any X and Y directions (906 and 908).

Elements of the monochromator module 90C under control may include monochromator excitation (910), monochromator emission (912), monochromator PMT (916), fiber optics selection (918), and light sources such as a flash lamp 914.

Elements of the imager module 90D under control may include an objective selector 930, an image capturing device such as camera 920, a focus drive 924 for objectives, LED and filter cube selector 922 for wide field imaging, confocal cubes selector 928, and spinning disk module and control (926) (e.g. selection and focusing), and laser scanning confocal module control (927).

Figure 18:
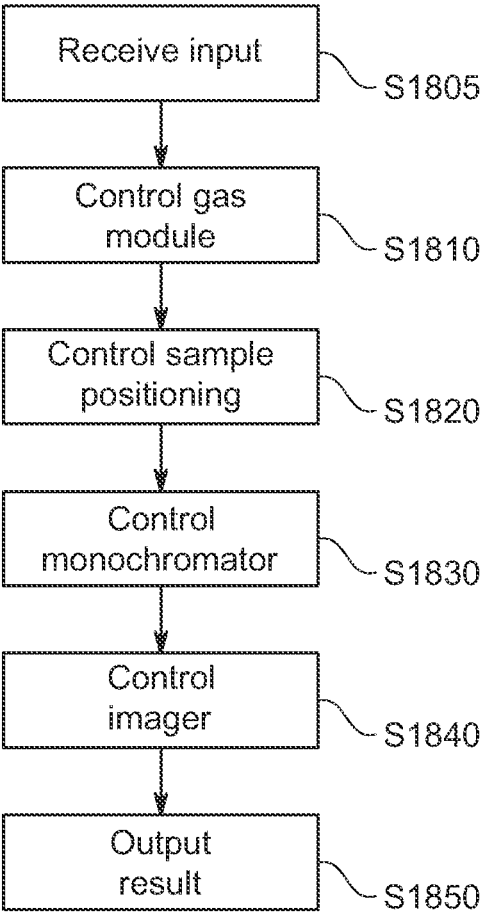
FIG. 18 is a flowchart of a control method of a multi-detection system according to an example embodiment.

FIG. 18 is a flowchart of control method of a multi-detection system according to an example embodiment.

Figure 26A:
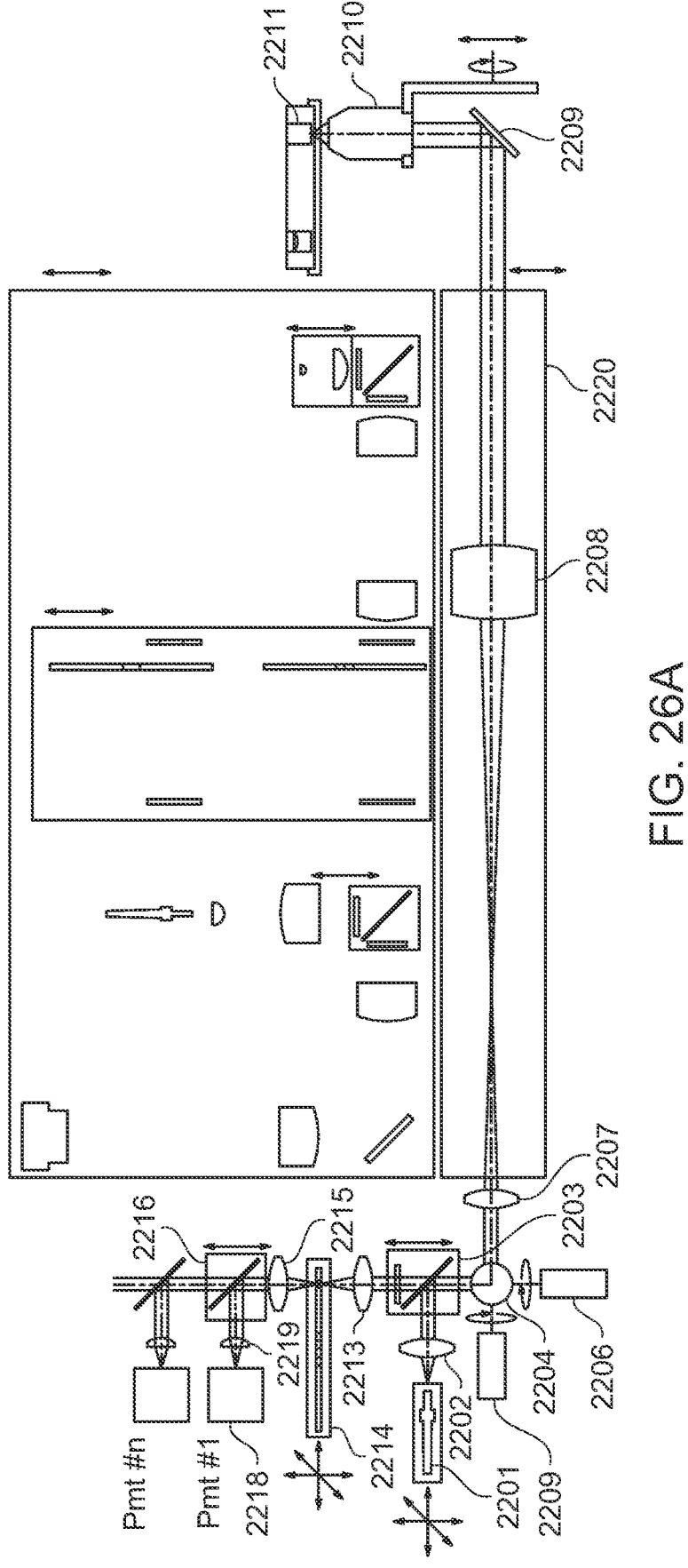
FIG. 26A is a first diagram of a multi-detection system in a laser point scanning confocal modality according to an embodiment.
Figure 26B:
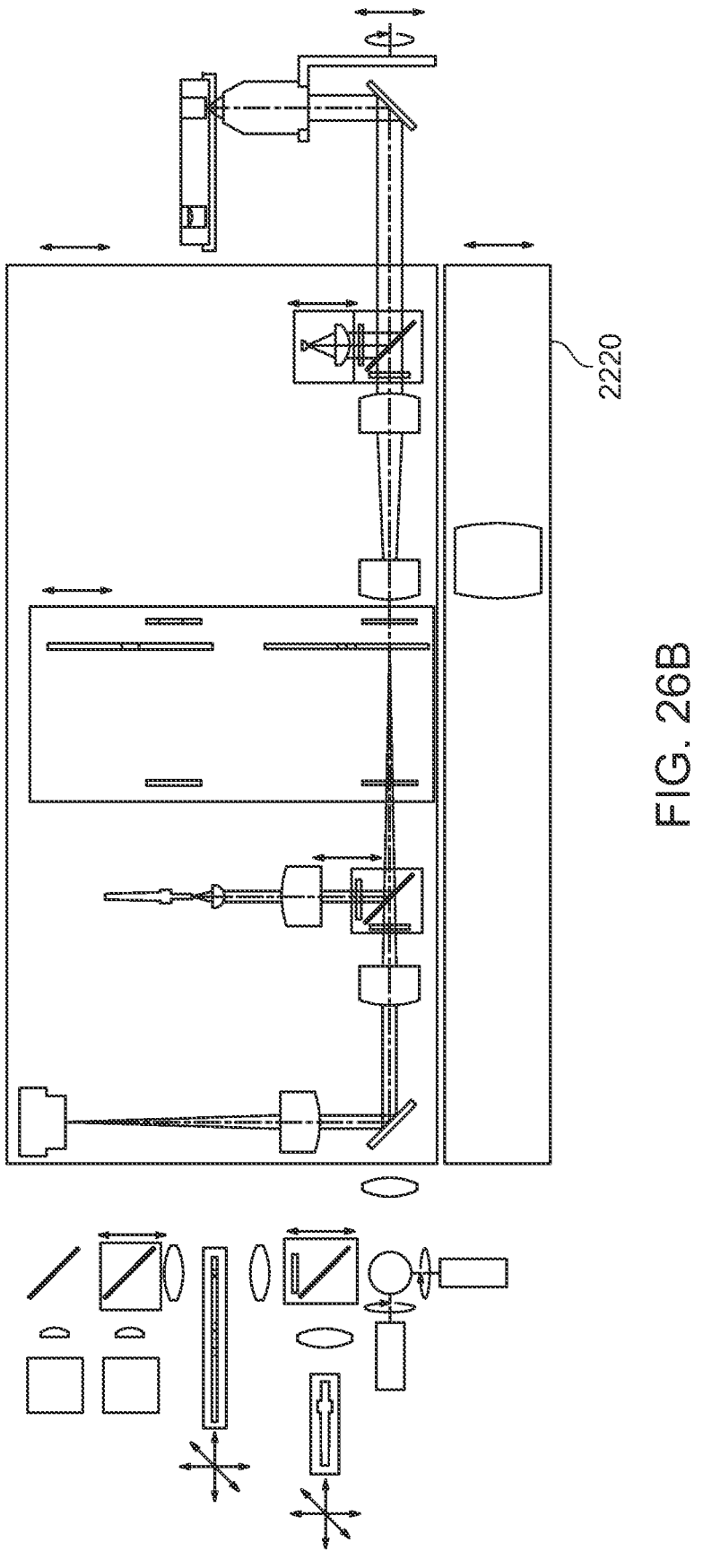
FIG. 26B is a second diagram of the multi-detection system in a wide field or spinning disk confocal modality according to the embodiment.

Control of the instrument may be coordinated through use of the controller, as discussed above with respect to, for example, FIG. 17 and/or FIGS. 26A-26B. Input to the instrument (step S1805) may be accomplished through a local user interface of the instrument, such as a touch pad or graphical display, or through communication with the instrument over a wired or wireless connection, such as over a network.

In the case of input to the instrument, input may be performed through the use of a user interface or graphical user interface displayed on a computer or other terminal that executes a control application.

The input may be user input, such as setting and parameters for executing control of the instrument.

In response to receiving input, control of the instrument may be effectuated through the various elements of the instrument as, for example, discussed above regarding FIG. 17 and/or FIGS. 26A-26B. For example, in response to receiving user input, the instrument may be controlled to execute a gas control procedure of the gas module (step S1810), a sample positioning control procedure to control positioning of samples (step S1820), a monochromator control procedure to control operations of the monochromator (step S1830), an imager control procedure to control the imager (step S1840), and to output a result of the controlling of the elements of the instrument (step S1850).

Although control is presented as illustrated in FIG. 18, elements may be individually controlled in any sequence, and control of all elements is not required. Accordingly, the multiple modalities of the instrument may be controlled in a single assay.

The control method illustrated in FIG. 18, and other functions described herein that may be performed by a controller, may be implemented through execution of a processing unit (e.g., CPU) controlling elements of the instrument by executing one or more control programs. The programs may be stored in a memory (i.e., RAM, ROM, flash, etc.), or other computer-readable medium (i.e., CD-ROM, disk, etc.). The program may be executed locally by the instrument, or by a control apparatus, such as a computer that transmits commands to be executed by the instrument.

Figure 27:
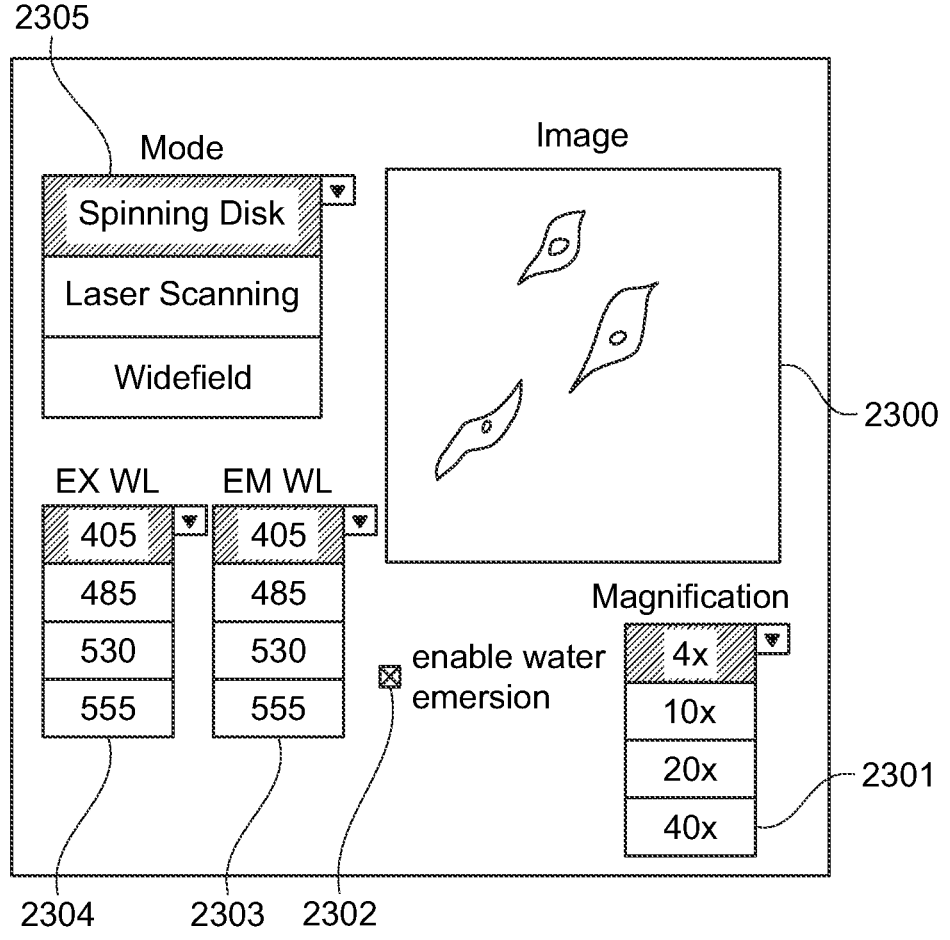
FIG. 27 is a diagram of an example user interface according to an embodiment.

With reference to FIG. 27, embodiments of the present disclosure may include a display, and the controller may be further configured to cause the display to display a user interface. FIG. 27 illustrates an example of the user interface in a case where the instrument has a combination of various optical modes. Element 2300 is an image of the sample. Element 2301 is a drop-down menu for selecting a magnification. Element 2302 is a selection box to enable/disable water immersion. If selected, and the objective is configured for water immersion, the controller may cause water to be automatically pumped to the objective and may automatically remove water when imaging is completed or the check box of element 2302 is deselected. Element 2303 is a drop-down list for the EM wavelength selection. FIG. 27 illustrates that a selection between 4 different EM wavelengths may be provided, but any number of EM wavelength selections may be provided. Element 2304 is a drop-down list for the EX wavelength selection. FIG. 27 illustrates that a selection between 4 different EX wavelengths may be provided, but any number of EX wavelength selections may be provided. Element 2305 is a drop-down menu allowing one to select between the various modes of the instruction. FIG. 27 illustrates selection between modalities, where the system include spinning disk, laser scanning, and wide field modalities. According to embodiments, the modalities listed in element 2305 may depend on the modalities present in the system. The system may, for example, have any combination of the above-mentioned modalities (and/or additional modalities), or only a single modality. In a case where only a single modality is provided, element 2305 may not be provided. According to embodiments, elements 2301, 2302, 2303, 2304, and 2305 are not limited to being drop-down menus and selection boxes, and may indicate options for selection in any manner known to a person of ordinary skill in the art.

According to embodiments, the interface may include display elements that enable a user to select a plurality of modalities to automatically be performed in a sequence. For example, based on one or more inputs from a user with respect to the interface, the controller may be configured to control the sequence to automatically be performed. The sequence may include any order of modality operations, including the orders of modality operations described in the present disclosure. For example, an operation using the spinning disk or wide field imaging system and then an operation using the laser point scanning confocal system may be performed.

Embodiments of the disclosure have been described for illustrative purposes, and those skilled in the art will appreciate that various modifications, additions and substitutions are possible without departing from the scope and spirit of the disclosure.

What is claimed is:

1. A device for analyzing a sample, the device comprising:
a receptacle support configured to support a microplate comprising a microplate well configured to hold the sample;
an objective configured for imaging the sample;
a laser point scanning confocal system configured to image the sample via the objective; and
a spinning disk or wide field imaging system configured to image the sample via the objective,
wherein at least a portion of both the laser point scanning confocal system and the spinning disk or wide field imaging system is movably provided such that the laser point scanning confocal system and the spinning disk or wide field imaging system are configured to be selectively aligned with the objective for imaging the sample.

2. The device of claim 1, wherein the objective is a liquid immersion objective.

3. The device of claim 2, wherein
the liquid immersion objective is provided with a sleeve that is mounted to a top end of the objective, and
the sleeve comprises:
a protruding portion that follows a contour of a lens of the liquid immersion objective, towards a top surface of the lens, wherein a space is provided between the protruding portion and the lens of the liquid immersion objective, the space configured to receive a liquid that is to be provided to the top surface of the lens for liquid immersion, and
a top wall, wherein a groove is provided between the top wall and the protruding portion, the groove configured to receive a portion of the liquid after the portion of the liquid is provided to the top surface of the lens.

4. The device of claim 3, wherein a top surface of the sleeve is flush with the top surface of the lens.

5. The device of claim 1, further comprising:
a display; and
a controller configured to control the laser point scanning confocal system and the spinning disk or wide field imaging system, and further configured to cause the display to display an interface that enables a user to select between use of the laser point scanning confocal system and the spinning disk or wide field imaging system.

6. The device of claim 5, wherein the controller is further configured to perform a first operation using the spinning disk or wide field imaging system and then a second operation using the laser point scanning confocal system, based on an input by the user with respect to the interface.

7. The device of claim 1, further comprising a controller configured to control the laser point scanning confocal system and the spinning disk or wide field imaging system, wherein the controller is further configured to:
image the sample using the spinning disk or wide field imaging system; and
image the sample to using the laser point scanning confocal system, after imaging the sample using the spinning disk or wide field imaging system.

8. The device of claim 1, further comprising a controller configured to control the laser point scanning confocal system and the spinning disk or wide field imaging system, wherein the controller is further configured to:
image the sample using the spinning disk or wide field imaging system; and
image an area of interest of the sample using the laser point scanning confocal system, after the area of interest is identified through imaging the sample using the spinning disk or wide field imaging system.

9. The device of claim 1, further comprising a controller configured to control the laser point scanning confocal system and the spinning disk or wide field imaging system, wherein the controller is further configured to:

photobleach an area of the sample using the laser point scanning confocal system; and image the area of the sample using the spinning disk or wide field imaging system, after photobleaching the area of the sample using the laser point scanning confocal system.

10. The device of claim 1, wherein a portion of the laser point scanning confocal system is configured to be selectively aligned with the objective, for imaging the sample using the laser point scanning confocal system, by the portion of the laser point scanning confocal system moving to a position, and wherein a portion of the spinning disk or wide field imaging system is configured to be selectively aligned with the objective, for imaging the sample using the spinning disk or wide field imaging system, by the portion of the spinning disk or wide field imaging system moving to the position.

11. The device of claim 1, wherein the laser point scanning confocal system comprises a first detector configured to image the sample in a laser point scanning confocal process, and wherein the spinning disk or wide field imaging system comprises a second detector configured to image the sample in a spinning disk or wide field imaging process.

12. The device of claim 1, wherein the laser point scanning confocal system comprises a first light source configured to emit first light for imaging the sample in a laser point scanning confocal process, and wherein the spinning disk or wide field imaging system comprises a second light source configured to emit second light for imaging the sample in a spinning disk or wide field imaging process.

\* \* \* \* \*